(12) United States Patent
Chen et al.

(10) Patent No.: US 10,944,977 B2
(45) Date of Patent: Mar. 9, 2021

(54) METHODS AND APPARATUS FOR ENCODING AND DECODING OVERLAY COMPOSITIONS

(71) Applicant: MEDIATEK Singapore Pte. Ltd., Singapore (SG)

(72) Inventors: Lulin Chen, San Jose, CA (US); Xin Wang, San Jose, CA (US)

(73) Assignee: MEDIATEK Singapore Pte. Ltd., Singapore (SG)

( * ) Notice: Subject to any disclaimer, the term of this patent is extended or adjusted under 35 U.S.C. 154(b) by 50 days.

(21) Appl. No.: 16/363,843

(22) Filed: Mar. 25, 2019

(65) Prior Publication Data
US 2019/0306519 A1    Oct. 3, 2019

Related U.S. Application Data

(60) Provisional application No. 62/694,537, filed on Jul. 6, 2018, provisional application No. 62/680,657, filed
(Continued)

(51) Int. Cl.
*H04N 19/33*   (2014.01)
*H04N 19/62*   (2014.01)
(Continued)

(52) U.S. Cl.
CPC ........... *H04N 19/33* (2014.11); *H04N 19/162* (2014.11); *H04N 19/187* (2014.11); *H04N 19/1883* (2014.11); *H04N 19/62* (2014.11)

(58) Field of Classification Search
CPC .... H04N 19/33; H04N 19/62; H04N 19/1883; H04N 19/187; H04N 19/162
(Continued)

(56) References Cited

U.S. PATENT DOCUMENTS

2007/0086739 A1   4/2007   Kikuchi et al.
2009/0055417 A1   2/2009   Hannuksela
(Continued)

FOREIGN PATENT DOCUMENTS

CN   101711483 A   5/2010
CN   101897193 A   11/2010
(Continued)

OTHER PUBLICATIONS

[No Author Listed], Information technology—Coded representation of immersive media—Part 2: Omnidirectional media format. ISO/IEC FDIS 23090-2:201x (E). Feb. 7, 2018:178 pages.
(Continued)

*Primary Examiner* — On S Mung
(74) *Attorney, Agent, or Firm* — Wolf, Greenfield & Sacks, P.C.

(57) ABSTRACT

The techniques described herein relate to methods, apparatus, and computer readable media configured to encode and decode multimedia data. A hierarchical track structure for the multimedia data is encoded with at least a first track and a second track, wherein the second track is above the first track. Overlay composition metadata is associated with the second track, wherein the overlay composition metadata comprises offset metadata, layer metadata, source metadata, or some combination thereof. The overlay composition metadata specifies at least part of an overlay composition for media data associated with the first track, wherein the overlay composition can be performed as part of a track derivation operation on media data associated with the first track to generate media data of the second track, such that the second track is a derived track of the first track.

22 Claims, 20 Drawing Sheets

Related U.S. Application Data on Jun. 5, 2018, provisional application No. 62/680,662, filed on Jun. 5, 2018, provisional application No. 62/679,060, filed on Jun. 1, 2018, provisional application No. 62/656,536, filed on Apr. 12, 2018, provisional application No. 62/656,553, filed on Apr. 12, 2018, provisional application No. 62/651,782, filed on Apr. 3, 2018.

(51) Int. Cl.
*H04N 19/169* (2014.01)
*H04N 19/187* (2014.01)
*H04N 19/162* (2014.01)

(58) Field of Classification Search
USPC ................................................ 375/240.26
See application file for complete search history.

(56) References Cited

U.S. PATENT DOCUMENTS

| | | | |
|---|---|---|---|
| 2012/0023250 | A1 | 1/2012 | Chen et al. |
| 2012/0221741 | A1 | 8/2012 | Frojdh et al. |
| 2017/0195697 | A1 | 7/2017 | Nair et al. |
| 2017/0237965 | A1 | 8/2017 | Wang et al. |
| 2018/0063505 | A1 | 3/2018 | Lee et al. |
| 2018/0213216 | A1* | 7/2018 | Hwang ............... H04N 7/01 |
| 2018/0332265 | A1 | 11/2018 | Hwang et al. |
| 2019/0141311 | A1 | 5/2019 | Lee et al. |
| 2019/0222822 | A1 | 7/2019 | Wang et al. |
| 2019/0253734 | A1 | 8/2019 | Lee et al. |
| 2019/0313081 | A1 | 10/2019 | Oh |
| 2019/0313084 | A1 | 10/2019 | Chavez et al. |
| 2019/0320155 | A1 | 10/2019 | Wang et al. |

FOREIGN PATENT DOCUMENTS

| | | |
|---|---|---|
| CN | 102132562 A | 7/2011 |
| WO | WO 2017/140946 A1 | 8/2017 |

OTHER PUBLICATIONS

[No Author Listed], Information technology—Coded representation of immersive media—Part 2: Omnidirectional media format. ISO/IEC JTC1/SC29/WG11 23090-2:2018(E) w17399. 2018:168 pages.
[No Author Listed], Information technology—Coding of audio-visual objects—Part 15: Carriage of network abstraction layer (NAL) unit structured video in the ISO base media file format. ISO/IEC FDIS 14496-15:2014(E). Jan. 13, 2014. 2014:182 pages.
[No Author Listed], Information technology—MPEG systems technologies—Part 12: Image File Format. ISO/IEC FDIS 23008-12 2nd Edition MPEG N16657. Jun. 26, 2015:93 pages.
Singer et al., Technologies under Consideration for ISOBMFF. International Organisation for Standardisation, Coding of Moving Pictures and Audio, ISO/IEC JTC1/SC29/WG11 MPEG2017/N17379. Jan. 2018:38 pages.
Wang et al., [OMAF] Editor's Input Text for OMAF WD Based on Finland AHG Agreements. International Organisation for Standardisation, Coding of Moving Pictures and Audio, ISO/IEC JTC1/SC29/WG11/M42923-v1. Jul. 2018:199 pages.
Wang et al., Deriving Composite Tracks in ISOBMFF using Track Grouping Mechanisms. Organisation for Standardisation, Coding of Moving Pictures and Audio, ISO/IEC JTC1/SC29/WG11 MPEG2016/M40384. Apr. 2017:12 pages.
Wang et al., Deriving Composite Tracks in ISOBMFF. International Organisation for Standardisation, Coding of Moving Pictures and Audio, ISO/IEC JTC1/SC29/WG11 MPEG2016/M39971. Jan. 2017:9 pages.
Wang et al., Deriving VR Projection and Mapping related Tracks in ISOBMFF. International Organisation for Standardisation, Coding of Moving Pictures and Audio, ISO/IEC JTC1/SC29/WG11 MPEG2016/M40385. Apr. 2017:8 pages.
Wang et al., Deriving VR ROI and Viewport related Tracks in ISOBMFF. International Organisation for Standardisation, Coding of Moving Pictures and Audio, ISO/IEC JTC1/SC29/WG11 MPEG2016/M40412. Apr. 2017:11 pages.
[No Author Listed], Information technology—Coded representation of immersive media (MPEG-I)—Part 2: Omnidirectional media format. ISO/IEC JTC1/SC29/WG11. Dec. 11, 2017:178 pages.
[No Author Listed], Information technology—Coding of audio-visual objects, Part 12: ISO base media file format. International Standard, ISO/IEC 14496-12, Fifth Edition. Feb. 20, 2015:250 pages.
Wang et al., OMAF: Track Derivation Hierarchy Approach to Association of Attributes and Metadata to Sub-Picture Composition Tracks. International Organisation for Standardisation, Coding of Moving Pictures and Audio, ISO/IEC JTC1/SC29/WG11 MPEG2017/m42120. Jan. 2018:4 pages.
Wang et al., WD 4 of ISO/IEC 23090-2 OMAF 2nd edition. International Organisation for Standardisation, Coding of Moving Pictures and Audio, ISO/IEC JTC1/SC29/WG11 N18227-v1. Jan. 2019:220 pages.
U.S. Appl. No. 16/245,113, filed Jan. 10, 2019, Wang et al.
U.S. Appl. No. 16/381,846, filed Apr. 11, 2019, Wang et al.

* cited by examiner

```
aligned(8) class DerivedVisualSampleEntry extends VisualSampleEntry ('dtrk'){
    DerivedTrackConfigRecord derived_config_rec; // mandatory
}
```

FIG. 3A

```
aligned(8) class DerivedTrackConfigRecord() extends Box ('dtrC') {
    unsigned int(32) property_type[]; // until the end of the box;
}
```

FIG. 3B

```
aligned(8) class TransformProperty(property_type, version, flags) extends
FullBox(property_type, version, flags) {
                                    412
}
aligned(8) class ImageOperation(){
    entityBitCount = (entity_byte_len_minus1 + 1 ) * 8;
    unsigned int (entityBitCount-1) num_inputs;    402
    if (num_inputs == 0)
        numInputs = 1
    else
        numInputs = num_inputs;
                                                        404
    for (i=0; i<numInputs; i++) {                              410
        406 unsigned int(entityBitCount) entity_idx;
            if (IsTrack(entity_idx) && sample_offset_byte_len > 0)
                                                           408
            signed int(sample_offset_byte_len*8) sample_offset;
    }
    TransformProperty property;
}
aligned(8) class DerivedSample(){
    opIdx = num_entities;
    do {
        ImageOperation image_operation[opIdx++];
    } while (!EndOfSample());
}
```

```
aligned(8) class TransformProperty(property_type, version, flags)
    extends FullBox(property_type, version, flags)
{
}
// a transform derives from this class and may supply parameters here aligned(8) class ImageOperation(){    ← 452
    unsigned int(8) num_inputs;
    for (i=0; i< num_inputs; i++) {
        unsigned int(8) track_ref_index_or_zero;    ← 454
    }
    TransformProperty property;
} aligned(8) class DerivedSample(){
    ImageOperation image_operation[];
}
```

```
aligned(8) class DerivedVisualSampleEntry extends VisualSampleEntry ('dtrk'){
    unsigned int(1) sample_offset_flag;  // 502
    unsigned int(7) reserved = 0;  // 504
    DerivedTrackConfigRecord derived_config_rec; // mandatory  // 506
}
```
— 501

```
aligned(8) class DerivedTrackConfigRecord() extends Box ('dtrC') {
    if (sample_offset_flag == 1) {                          602
        unsigned int(3) entity_byte_len_minus1;      604
        unsigned int(3) sample_offset_byte_len;
        unsigned int(2) reserved = 0;         606
    }
    Unsigned int(32) operation_4cc[]; // until the end of the box;   608
}
```
600

FIG. 6

```
aligned(8) class ImageOperation() {          712
    unsigned int(32) num_samples;
    do {
        if (sample_offset_flag == 1) {
            entityBitCount = (entity_byte_len_minus1 + 1) * 8;
            unsigned int(entityBitCount-1) num_inputs;      702
            if (num_inputs == 0)     numInputs = 1
            else                     numInputs = num_inputs;
            for (i=0; i<numInputs; i++) {       708
                unsigned int(entityBitCount) entity_idx;
                if (IsTrack(entity_idx) && sample_offset_byte_len > 0)
                    signed int(sample_offset_byte_len*8) sample_offset;}
                                                                           710
        } else {
            unsigned int(8) num_inputs;
            if (num_inputs == 0)     numInputs = 1
            else                     numInputs = num_inputs;
            for (i=0; i< numInputs; i++) {
                unsigned int(8) entity_idx;}
            // sample_offset is inferred to be equal to 0}
        }
        TransformProperty property; //sample/item based processing
    } while (!EndOfSample() && num_samples--);      716
}
```

704 → aligned(8) class ImageOperation()
700A → (first block)
700B → (second block)
700C → TransformProperty property
714 → while

```
aligned(8) class DerivedSample() {
    ImageOperation image_operation[];
}
```

FIG. 7B

```
aligned(8) class DerivedVisualSampleEntry extends VisualSampleEntry ('dtrk'){
    unsigned int(1) sample_offset_flag;  ←— 502
    unsigned int(1) layer_flag;
    unsigned int(6) reserved = 0;  ←— 804
    DerivedTrackConfigRecord derived_config_rec; // mandatory
                                                         ↖ 506
}
```

```
aligned(8) class ImageOperation() {
    unsigned int(32) num_samples;
    do {
        if (sample_offset_flag == 1) {
            entityBitCount = (entity_byte_len_minus1 + 1) * 8;
            unsigned int(entityBitCount-1) num_inputs;
            if (num_inputs == 0)     numInputs = 1
            else                     numInputs = num_inputs;
            for (i=0; i<numInputs; i++) {
                unsigned int(entityBitCount) entity_idx;
                if (isTrack(entity_idx) && sample_offset_byte_len > 0)
                    signed int(sample_offset_byte_len*8) sample_offset;}
            if (layer_flag == 1)
                int(16) layer;}
        } else {
            unsigned int(8) num_inputs;
            if (num_inputs == 0)     numInputs = 1
            else                     numInputs = num_inputs;
            for (i=0; i< numInputs; i++){
                unsigned int(8) entity_index;}
            if (layer_flag == 1)
                int(16) layer;}
        { TransformProperty property; //sample/item based processing
    } while (!EndOfSample()&& num_samples--);
}
```

FIG. 8B

```
aligned(8) class OverlayRelationshipDescriptionBox extends TrackGroupTypeBox ('ovlr') {
// track_group_id is inherited from TrackGroupTypeBox;
unsigned int(1) relative_to_viewport_flag;     1004
unsigned int(1) relative_disparity_flag;       1006
unsigned int(1) depth_included_flag;           1008
bit(5) reserved = 0;
// the following fields and operations for conditional fields are either all present or all absent
unsigned int(8) overlay_region_count;
for (i =0; i<overlay_region_count; i++) {
  string overlay_region_id;
  unsigned int(8) overlay_region_opacity;
  if(relative_to_viewport_flag == 1) {
    if (relative_disparity_flag)
      signed int(16) disparity_in_percent;
    else
      signed int(16) disparity_in_pixels;
    signed int(16) centerAzimuth_offset_percent;
    signed int(16) centerElevation_offset_percent;
    unsigned int(16) width_percent;
    unsigned int(16) height_percent;
  } else {
    SphereRegionStruct(0);
    if (depth_included_flag)  unsigned int(16) overlay region depth ;
    else   int(16) overlay_layer ;
  }
  unsigned int(16) source depth;
}
```

FIG. 10

```
class OverlayRelationshipGroupEntry () extends VisualSampleGroupEntry ('olrd') {
    unsigned int(8) overlay_region_count; ◄——1102
    for (i=0; i<overlay_region_count; i++) {
        string overlay_region_id; ◄——1104
        unsigned int(8) overlay_region_opacity; ◄——1106
        if(relative_to_viewport_flag == 1) {
            if (relative_disparity_flag)
                signed int(16) disparity_in_percent; ◄——1108
            else
                signed int(16) disparity_in_pixels; ◄——1110
            signed int(16) centerAzimuth_offset_percent; ◄——1112
            signed int(16) centerElevation_offset_percent; ◄——1114
            unsigned int(16) width_percent; ◄——1116
            unsigned int(16) height_percent; ◄——1118
        } else {
            SphereRegionStruct(); ◄——1120
            if (depth_included_flag)
                unsigned int(16) overlay_region_depth; ◄——1122
            else
                int(16) overlay_layer; ◄——1124
        }
    }
}
```

FIG. 11A

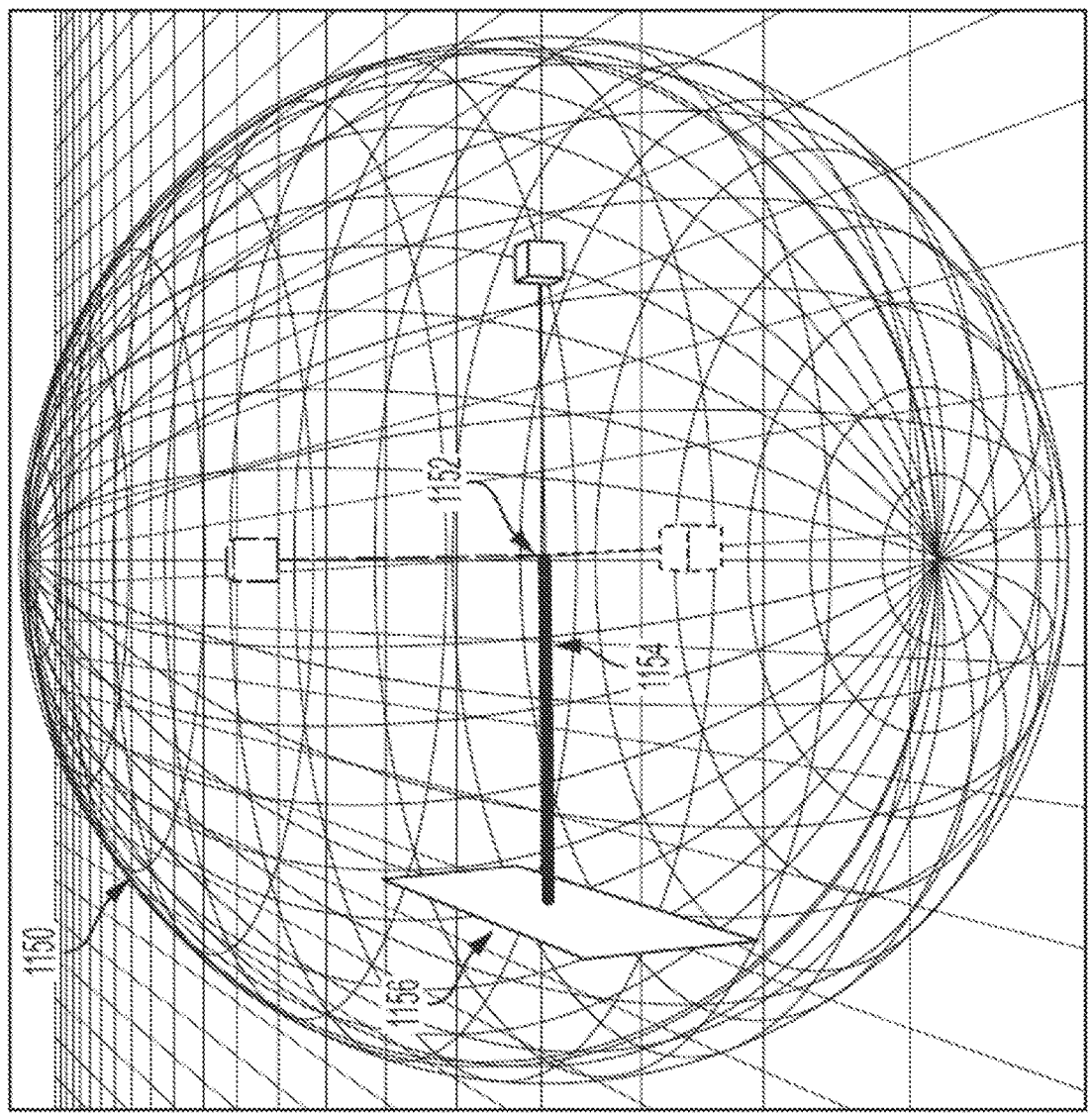

```
aligned (8) class OverlayRelationshipDescriptionBox extends FullBox('ovld', 0, 0) {
    unsigned int(8) source_count;  ← 1310
    for (i=0; i<source_count; i++) {
        unsigned int(32) source_ID;  ← 1312
        unsigned int(1) relative_to_viewport_flag;  ← 1314
        unsigned int(1) relative_disparity_flag;  ← 1316
        unsigned int(1) depth_included_flag;  ← 1318
        bit(5) reserved = 0;  ← 1320
        unsigned int(8) overlay_region_count;
        for (i=0; i<overlay_region_count; i++) {  ← 1322
            string overlay_region_id;
            unsigned int(8) overlay_region_opacity;  ← 1324
            if (relative_to_viewport_flag == 1) {
                if (relative_disparity_flag)  ← 1326
                    signed int(16) disparity_in_percent;  ← 1328
                else
                    signed int(16) disparity_in_pixels;  ← 1330
                signed int(16) center_Azimuth_offset_percent;  ← 1332
                signed int(16) center_Elevation_offset_percent;
                unsigned int(16) width_percent;  ← 1334
                unsigned int(16) height_percent;  ← 1336
            } else {  ← 1338
                SphereRegionStruct(0);
                if (depth_included_flag)  ← 1308
                    unsigned int(16) overlay_region_depth;  ← 1304
                else
                    int(16) overlay_layer;  ← 1306
            } unsigned int(16) source_depth;  ← 1340
    int (16) layer; }}
```

FIG. 13

```
aligned(8) class TrackOverlaySampleEntry extends MetadataSampleEntry ('trko') {
    unsigned int(1) relative_to_viewport_flag; ← 1404
    unsigned int(1) relative_disparity_flag; ← 1406
    unsigned int(1) depth_included_flag; ← 1408
    bit(5) reserved = 0;
    unsigned int(8) overlay_region_count; ← 1410
}
```

```
aligned(8) class TrackOverlaySample () {
    for (i=0; i<overlay_region_count ; i++) {  1502
        string overlay_region_id;
        unsigned int(8) overlay_region_opacity;
        if (relative_to_viewport_flag == 1) {   1504
            if (relative_disparity_flag)
                signed int(16) disparity_in_percent;   1506
            else
                signed int(16) disparity_in_pixels;   1508
            signed int(16) centerAzimuth_offset_percent;   1510
            signed int(16) centerElevation_offset_percent;   1512
            unsigned int(16) width_percent;
            unsigned int(16) height_percent;   1514
        }
        else {
            SphereRegionStruct();   1516
            if (depth_included_flag)   1518
                unsigned int(16) overlay_region_depth;
        }
        else
            int(16) overlay_layer;   1520
    }
}
```

METHODS AND APPARATUS FOR ENCODING AND DECODING OVERLAY COMPOSITIONS

RELATED APPLICATIONS

This Application claims priority under 35 U.S.C. § 119(e) to U.S. Provisional Application Ser. No. 62/651,782, filed Apr. 3, 2018, entitled "METHOD OF SPECIFYING DERIVED TRACK WITH FLEXIBILITY IN ISOBMFF", U.S. Provisional Application Ser. No. 62/656,536, filed Apr. 12, 2018, entitled "METHOD OF TRACK LAYER ARRANGEMENT FOR DERIVED TRACK COMPOSITION FOR ISOBMFF", U.S. Provisional Application Ser. No. 62/656,553, filed Apr. 12, 2018, entitled "METHOD OF SPECIFYING COMPOSITION METADATA FOR IMMERSIVE MEDIA", U.S. Provisional Application Ser. No. 62/679,060, filed Jun. 1, 2018, entitled "METHOD OF SIGNALING IMMERSIVE MEDIA CONTENT OVERLAYS USING TIMED METADATA TRACKS IN ISOBMFF", U.S. Provisional Application Ser. No. 62/680,662, filed Jun. 5, 2018, entitled "METHOD OF SPECIFYING TRACK GROUPING FOR OVERLAY COMPOSITION", U.S. Provisional Application Ser. No. 62/680,657, filed Jun. 5, 2018, entitled "METHOD OF SPECIFYING IMMERSIVE MEDIA OVERLAY RELATIONSHIP WITH THE DERIVED VISUAL TRACK", and U.S. Provisional Application Ser. No. 62/694,537, filed Jul. 6, 2018, entitled "METHOD OF SPECIFYING TIME METADATA FOR IMAGE ITEMS IN THE OVERLAY PROCESSING" which are herein incorporated by reference in their entirety.

TECHNICAL FIELD

The techniques described herein relate generally to video coding, and particularly to associating, storing and/or signaling overlay compositions, including overlay composition metadata used for overlay compositions.

BACKGROUND OF INVENTION

Various types of video content exist, including high resolution video, 3D content, and multi-directional content. For example, high resolution video can include large frame size video, such as video with a horizontal display resolution of approximately 4,000 pixels (e.g., 4K video), 8,000 pixels (e.g., 8K video), and the like. The video frames can be partitioned into several sub-pictures or tiles. The video can include overlay content, such as logos and/or previews, and the sub-picture and/or overlay composition can be performed in the rendering device. As another example, omni-directional video is a type of video that is captured using a set of cameras, as opposed to just a single camera as done with traditional video. For example, cameras can be placed around a particular center point, so that each camera captures a portion of video on a spherical coverage of the scene to capture 360-degree video. Video from multiple cameras can be stitched, possibly rotated, and projected to generate a projected two-dimensional picture representing the spherical content. This can be then further processed, for example, using two-dimensional encoding and compression techniques. Ultimately, the encoded and compressed content is stored and delivered using a desired delivery mechanism (e.g., thumb drive, digital video disk (DVD), file download, digital broadcast, and/or online streaming). Such video can be used for virtual reality (VR) and/or 3D video.

SUMMARY OF INVENTION

In accordance with the disclosed subject matter, apparatus, systems, and methods are provided for associating, storing and/or signaling overlay compositions, including overlay composition metadata. The overlay composition metadata, as discussed further herein, can be provided using various techniques (e.g., various data structures) and using various mechanisms to associate the overlay composition metadata with the media content (e.g., track groups, derived tracks, timed metadata tracks, and/or the like).

Some embodiments relate to a decoding method for decoding video data. The method includes receiving multimedia data comprising a hierarchical track structure comprising at least a first track and a second track, wherein the first track is at a first level in the hierarchical track structure, and the second track is at a second level in the hierarchical track structure above the first level of the first track. The method includes determining overlay composition metadata associated with the second track, wherein the overlay composition metadata comprises offset metadata, layer metadata, source metadata, or some combination thereof. The method includes performing a track derivation operation on media data associated with the first track, comprising performing, based on the overlay composition metadata, an overlay composition of the media data associated with the first track to generate media data of the second track such that the second track is a derived track of the first track.

In some examples, the overlay composition metadata comprises the offset metadata and the media data associated with the first track comprises one or more input tracks for the composition, and the method further comprises determining, based on the offset metadata, whether an offset is specified for each of the one or more input tracks. In some examples, the decoding method further includes determining, based on the offset metadata, an offset is specified for each of the one or more inputs, and performing the overlay composition of the media data comprises performing the overlay composition based on the offset of each of the one or more input tracks.

In some examples, the overlay composition metadata comprises the layer metadata and the media data associated with the first track comprises one or more input tracks for the composition, and the method further includes determining, based on the layer metadata, whether a layer is specified for each of the one or more inputs. The method can further include determining, based on the layer metadata, a layer is specified for each of the one or more inputs, and performing the overlay composition of the media data comprises performing the overlay composition based on the layer of each of the one or more input tracks.

In some examples, the media data associated with the first track comprises one or more input tracks for the composition and the overlay composition metadata comprises the source metadata, the source metadata comprising a source count that specifies the number of one or more input tracks, and a source depth that specifies a depth for three-dimensional content; and performing the overlay composition of the media data comprises performing the overlay composition based on the source depth of each of the one or more input tracks.

In some examples, the media data associated with the first track comprises one or more input tracks for the composition, and determining the overlay composition metadata comprises determining overlay relationship description metadata, wherein the overlay relationship description metadata specifies, for each input track of the one or more input tracks, overlay metadata specific to the associated input track.

Some embodiments relate to an apparatus configured to decode video data. The apparatus comprises a processor in communication with memory, the processor being configured to execute instructions stored in the memory that cause the processor to receive multimedia data comprising a hierarchical track structure comprising at least a first track and a second track, wherein the first track is at a first level in the hierarchical track structure, and the second track is at a second level in the hierarchical track structure above the first level of the first track. The processor is configured to execute instructions stored in the memory that cause the processor to determine overlay composition metadata associated with the second track, wherein the overlay composition metadata comprises offset metadata, layer metadata, source metadata, or some combination thereof, and perform a track derivation operation on media data associated with the first track, comprising performing, based on the overlay composition metadata, an overlay composition of the media data associated with the first track to generate media data of the second track such that the second track is a derived track of the first track.

In some examples, the overlay composition metadata comprises the offset metadata and the media data associated with the first track comprises one or more input tracks for the composition, and the processor is configured to execute instructions stored in the memory that cause the processor to determine, based on the offset metadata, whether an offset is specified for each of the one or more input tracks. In some examples, the processor is configured to execute instructions stored in the memory that cause the processor to determine, based on the offset metadata, an offset is specified for each of the one or more inputs, and perform the overlay composition of the media data comprises performing the overlay composition based on the offset of each of the one or more input tracks.

In some examples, the overlay composition metadata comprises the layer metadata and the media data associated with the first track comprises one or more input tracks for the composition, and the processor is configured to execute instructions stored in the memory that cause the processor to determine, based on the layer metadata, whether a layer is specified for each of the one or more inputs. In some examples, the processor is configured to execute instructions stored in the memory that cause the processor to determine, based on the layer metadata, a layer is specified for each of the one or more inputs, and perform the overlay composition of the media data comprises performing the overlay composition based on the layer of each of the one or more input tracks.

In some examples, the media data associated with the first track comprises one or more input tracks for the composition, the overlay composition metadata comprises the source metadata, the source metadata comprising a source count that specifies the number of one or more input tracks, and a source depth that specifies a depth for three-dimensional content, and performing the overlay composition of the media data comprises performing the overlay composition based on the source depth of each of the one or more input tracks.

In some examples, the media data associated with the first track comprises one or more input tracks for the composition, and determining the overlay composition metadata comprises determining overlay relationship description metadata, wherein the overlay relationship description metadata specifies, for each input track of the one or more input tracks, overlay metadata specific to the associated input track.

Some embodiments relate to a method for encoding video data. The method includes encoding a hierarchical track structure for multimedia data comprising at least a first track and a second track, wherein the first track is at a first level in the hierarchical track structure, and the second track is at a second level in the hierarchical track structure above the first level of the first track. The method includes encoding overlay composition metadata associated with the second track, wherein the overlay composition metadata comprises offset metadata, layer metadata, source metadata, or some combination thereof, wherein the overlay composition metadata specifies at least part of an overlay composition for media data associated with the first track, wherein the overlay composition can be performed as part of a track derivation operation on media data associated with the first track to generate media data of the second track, such that the second track is a derived track of the first track.

In some examples, encoding the hierarchical track structure comprises encoding the media data associated with the first track, comprising one or more input tracks for the overlay composition, and encoding the overlay composition metadata comprises encoding the offset metadata, wherein the offset metadata indicates whether an offset is specified for each of the one or more input tracks. In some examples, encoding the offset metadata comprises encoding data indicative of an offset being specified for each of the one or more inputs.

In some examples, encoding the hierarchical track structure comprises encoding the media data associated with the first track, comprising one or more input tracks for the overlay composition, and encoding the overlay composition metadata comprises encoding the layer metadata, wherein the layer metadata indicates whether a layer is specified for each of the one or more inputs. In some examples, encoding the layer metadata comprises encoding data indicative of a layer being specified for each of the one or more inputs.

In some examples, encoding the hierarchical track structure comprises encoding the media data associated with the first track, comprising one or more input tracks for the overlay composition, and encoding the overlay composition metadata comprises encoding the source metadata, the source metadata comprising a source count that specifies the number of one or more input tracks, and a source depth that specifies a depth for three-dimensional content.

In some examples, encoding the hierarchical track structure comprises encoding the media data associated with the first track, comprising one or more input tracks for the overlay composition, and encoding the overlay composition metadata comprises encoding overlay relationship description metadata, wherein the overlay relationship description metadata specifies, for each input track of the one or more input tracks, overlay metadata specific to the associated input track.

Some embodiments relate to an apparatus for encoding video data. The apparatus includes a processor in communication with memory, the processor being configured to execute instructions stored in the memory that cause the processor to encode a hierarchical track structure for multimedia data comprising at least a first track and a second track, wherein the first track is at a first level in the hierarchical track structure; and the second track is at a second level in the hierarchical track structure above the first level of the first track. The processor is configured to execute instructions stored in the memory that cause the processor to encode overlay composition metadata associated with the second track, wherein the overlay composition metadata comprises offset metadata, layer metadata, source metadata, or some combination thereof, wherein the overlay composition metadata specifies at least part of an overlay composition for media data associated with the first track, wherein the overlay composition can be performed as part of a track derivation operation on media data associated with the first track to generate media data of the second track, such that the second track is a derived track of the first track.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 3A shows an exemplary syntax for a sample entry of a derived visual track, according to some examples.

FIG. 3B shows an exemplary syntax of a derived track configuration record, according to some examples.

FIG. 4A shows a first exemplary syntax of a sample of a derived visual track, according to some examples.

FIG. 4B shows a second exemplary syntax of a sample of a derived visual track, according to some examples.

FIG. 5 shows an exemplary syntax for a sample entry of a derived visual track, according to some embodiments.

FIG. 6 shows an exemplary syntax for a derived track configuration record, according to some embodiments.

FIGS. 7A and 7B show an exemplary syntax 700 for a sample of a derived visual track, according to some embodiments.

FIG. 8A shows a syntax for a sample entry of a derived visual track, according to some embodiments.

FIG. 8B shows a syntax for a sample of a derived visual track, according to some embodiments.

FIG. 10 shows an exemplary syntax for specifying an overlay relationship, according to some embodiments.

FIG. 11A shows an exemplary syntax for specifying an overlay relationship sample group, according to some embodiments.

FIG. 11B shows a sphere with a specified rendering plane, according to some embodiments.

FIG. 13 shows an exemplary syntax for an overlay relationship description, according to some embodiments.

FIG. 14 shows an exemplary syntax for a track overlay sample entry, according to some embodiments.

FIG. 15 shows an exemplary syntax for a track overlay sample 1500, according to some embodiments.

DETAILED DESCRIPTION OF INVENTION

Various techniques can be used to improve existing video coding technology. As described herein, the inventors discovered and appreciated limitations with existing video coding techniques for providing overlay compositions. The inventors developed improvements to existing video coding technology, including various techniques for providing for overlay compositions (e.g., including various data structures that can be used to specify overlay composition metadata not otherwise available with existing technology). The inventors further developed various mechanisms that can be used to associate overlay composition metadata with the media content (e.g., including by using track groups, derived tracks, and/or timed metadata tracks).

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

Figure 1:
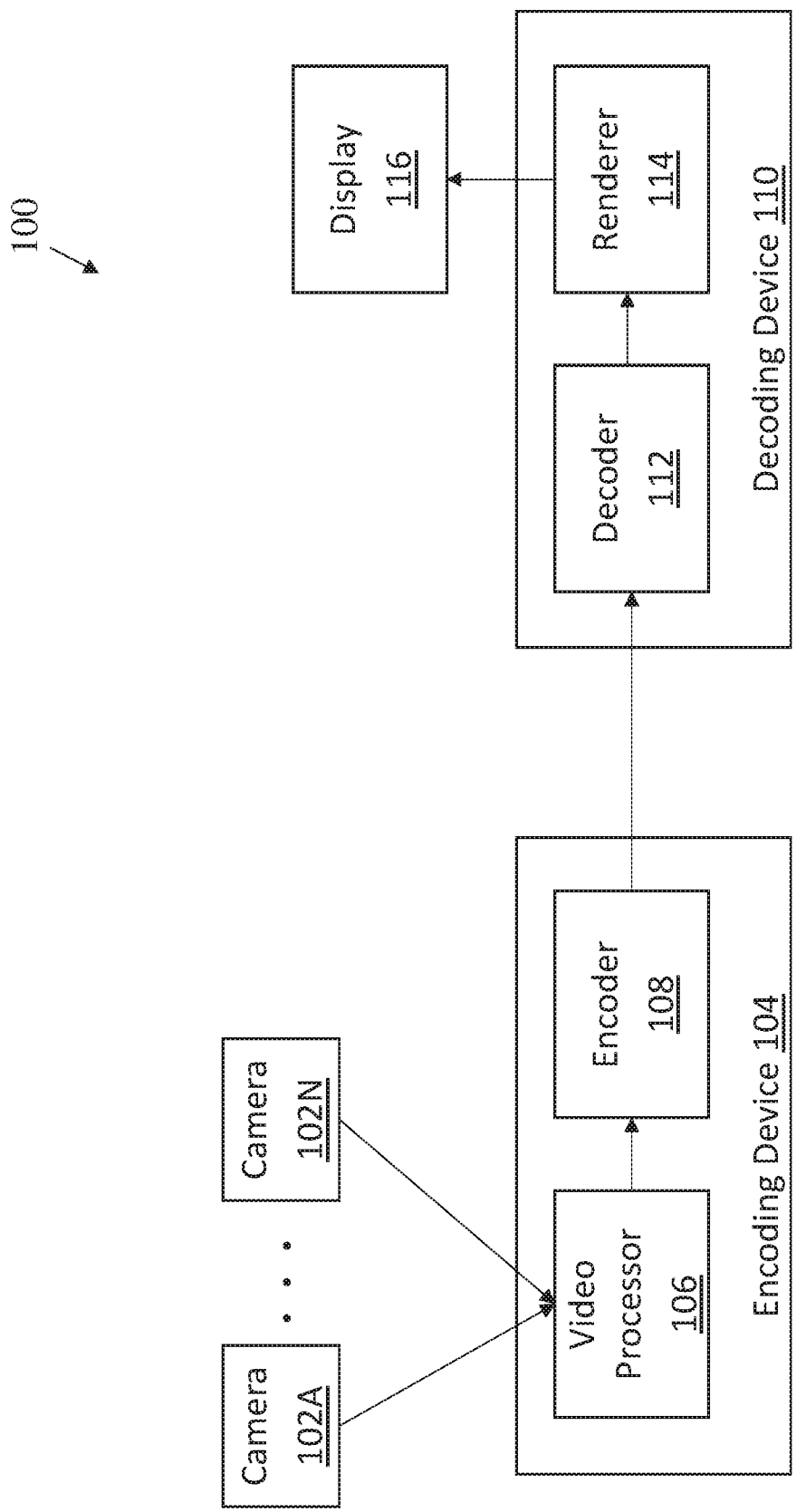
FIG. 1 shows an exemplary video coding configuration, according to some embodiments.

FIG. 1 shows an exemplary video coding configuration 100, according to some embodiments. Cameras 102A-102N are N number of cameras, and can be any type of camera (e.g., cameras that include audio recording capabilities, and/or separate cameras and audio recording functionality). The encoding device 104 includes a video processor 106 and an encoder 108. The video processor 106 processes the video received from the cameras 102A-102N, such as stitching, projection, and/or mapping. The encoder 108 encodes and/or compresses the two-dimensional video data. The decoding device 110 receives the encoded data. The decoding device 110 may receive the video as a video product (e.g., a digital video disc, or other computer readable media), through a broadcast network, through a mobile network (e.g., a cellular network), and/or through the Internet. The decoding device 110 can be, for example, a computer, a hand-held device, a portion of a head-mounted display, or any other apparatus with decoding capability. The decoding device 110 includes a decoder 112 that is configured to decode the encoded video. The decoding device 110 also includes a renderer 114 for rendering the two-dimensional content back to a sphere. The display 116 displays the rendered content from the renderer 114.

The ISO Base Media File Format (ISOBMFF) is a base format for media file formats that is described in "Image File Format," ISO/IEC FDIS 23008-12 $2^{nd}$ Edition, N16657, January 2017, Geneva, Switzerland, which is hereby incorporated by reference herein in its entirety. For example, ISOBMFF is the base format used for Dynamic Adaptive Streaming over HTTP (DASH) and MPEG Multimedia Transport (MMT). ISOBMFF is designed, for example, to contain timed media information for a presentation in a flexible, extensible format that facilitates interchange, management, editing, and presentation of the media. ISOBMFF includes sections for specifying image derivations. Over time, technologies are considered for inclusion in ISOBMFF, referred to as the Technologies Under Consideration (TuC). Some technologies under consideration for ISOBMFF have included proposed methods and designs to support new use cases, such as derived visual tracks that may support various compositions for presentations. However, the inventors have determined that existing technology does not sufficiently provide for overlay compositions, including overlay composition metadata.

The Omnidirectional MediA Format (OMAF) is specified in ISO/IEC 23090-2, which is hereby incorporated by reference herein in its entirety. OMAF specifies the omnidirectional media format for coding, storage, delivery, and rendering of omnidirectional media. OMAF specifies a coordinate system, such that the user's viewing perspective is from the center of a sphere looking outward towards the inside surface of the sphere. OMAF includes extensions to ISOBMFF for omnidirectional media as well as for timed metadata for sphere regions. ISO/IEC 14496-15 specifies the storage format for streams of video that is structured as network abstraction layer (NAL) units, which is hereby incorporated by reference herein in its entirety. OMAF includes extensions to ISOBMFF and ISO/IEC14496-15 that can be used for both omnidirectional media as well as for other purposes. OMAF as MPEG-1 Part 2 is currently at version 1, which is provided for in "Coded representation of immersive media (MPEG-1) Part 2: Omnidirectional media format," ISO/IEC 14496-12, w17399, February 2018, which is hereby incorporated by reference in its entirety.

Generally, 3DOF (3 degrees of freedom) content can be represented using spherical content to provide a 360 degree view of a scene (e.g., sometimes referred to as omnidirectional media content). While a number of views can be supported using the 3D sphere, an end user typically just views a portion of the content on the 3D sphere. The bandwidth required to transmit the entire 3D spherical content can place heavy burdens on a network, and may not be sufficient to support spherical content. It is therefore desirable to make 3D spherical content delivery more efficient. Viewport dependent processing can be performed to improve 3D spherical content delivery. The 3D spherical content can be divided into regions/tiles/sub-pictures, and only those related to viewing screen (e.g., viewport) can be transmitted and delivered to the end user.

Figure 2:
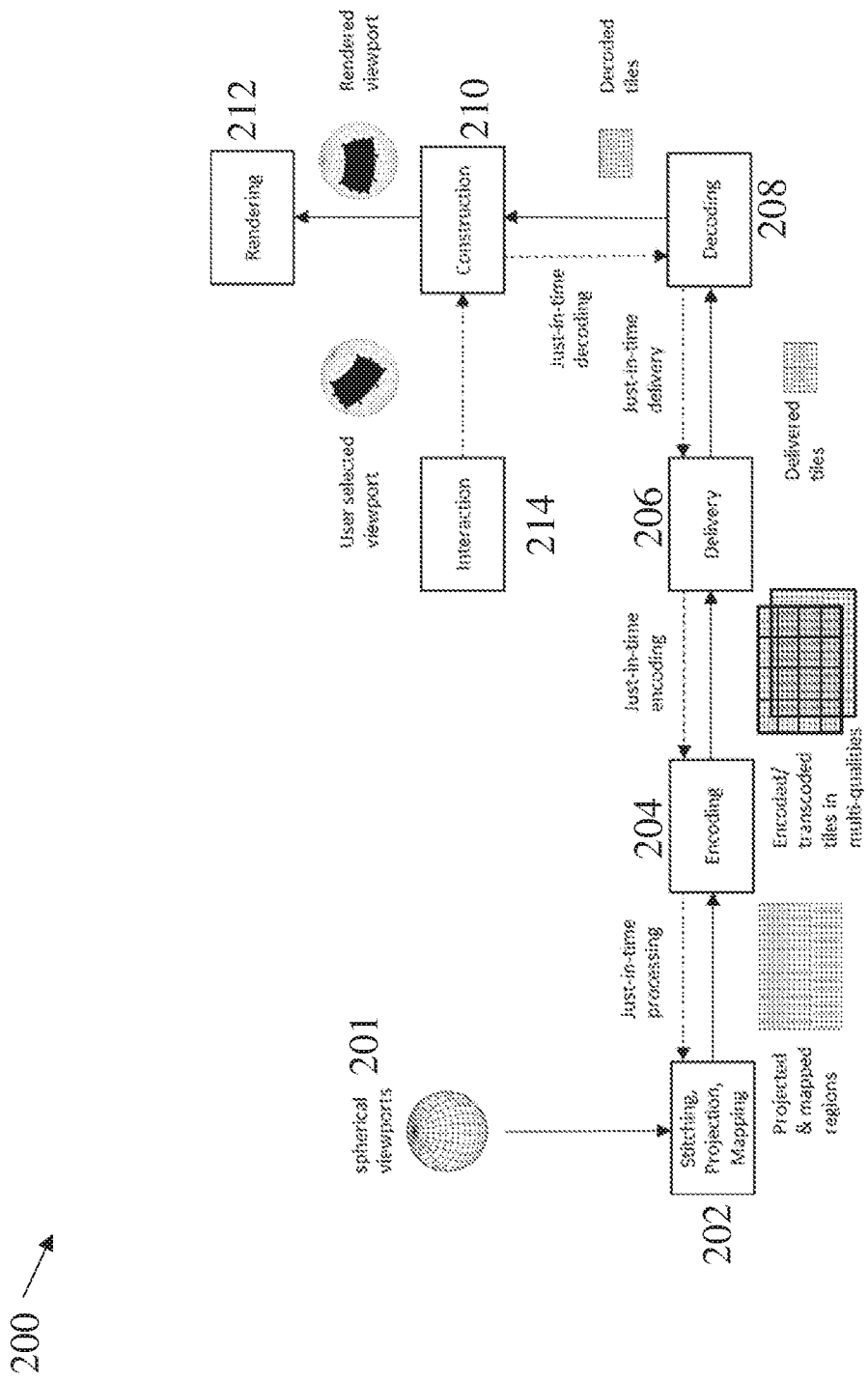
FIG. 2 shows a viewport dependent content flow process for virtual reality (VR) content, according to some examples.

FIG. 2 shows a viewport dependent content flow process 200 for VR content, according to some examples. As shown, spherical viewports 201 (e.g., which could include the entire sphere) undergo stitching, projection, mapping at block 202 (to generate projected and mapped regions), are encoded at block 204 (to generate encoded/transcoded tiles in multiple qualities), are delivered at block 206 (as tiles), are decoded at block 208 (to generate decoded tiles), are constructed at block 210 (to construct a spherical rendered viewport), and are rendered at block 212. User interaction at block 214 can select a viewport, which initiates a number of "just-in-time" process steps as shown via the dotted arrows.

In the process 200, due to current network bandwidth limitations and various adaptation requirements (e.g., on different qualities, codecs and protection schemes), the 3D spherical VR content is first processed (stitched, projected and mapped) onto a 2D plane (by block 202) and then encapsulated in a number of tile-based (or sub-picture-based) and segmented files (at block 204) for delivery and playback. In such a tile-based and segmented file, a spatial tile in the 2D plane (e.g., which represents a spatial portion, usually in a rectangular shape of the 2D plane content) is typically encapsulated as a collection of its variants, such as in different qualities and bitrates, or in different codecs and protection schemes (e.g., different encryption algorithms and modes). In some examples, these variants correspond to representations within adaptation sets in MPEG DASH. In some examples, it is based on user's selection on a viewport that some of these variants of different tiles that, when put together, provide a coverage of the selected viewport, are retrieved by or delivered to the receiver (through delivery block 206), and then decoded (at block 208) to construct and render the desired viewport (at blocks 210 and 212).

As shown in FIG. 2, the viewport notion is what the end-user views, which involves the angle and the size of the region on the sphere. For 360 degree content, generally, the techniques deliver the needed tiles/sub-picture content to the client to cover what the user will view. This process is viewport dependent because the techniques only deliver the content that covers the current viewport of interest, not the entire spherical content. The viewport (e.g., a type of spherical region) can change and is therefore not static. For example, as a user moves their head, then the system needs to fetch neighboring tiles (or sub-pictures) to cover the content of what the user wants to view next.

Figure 12:
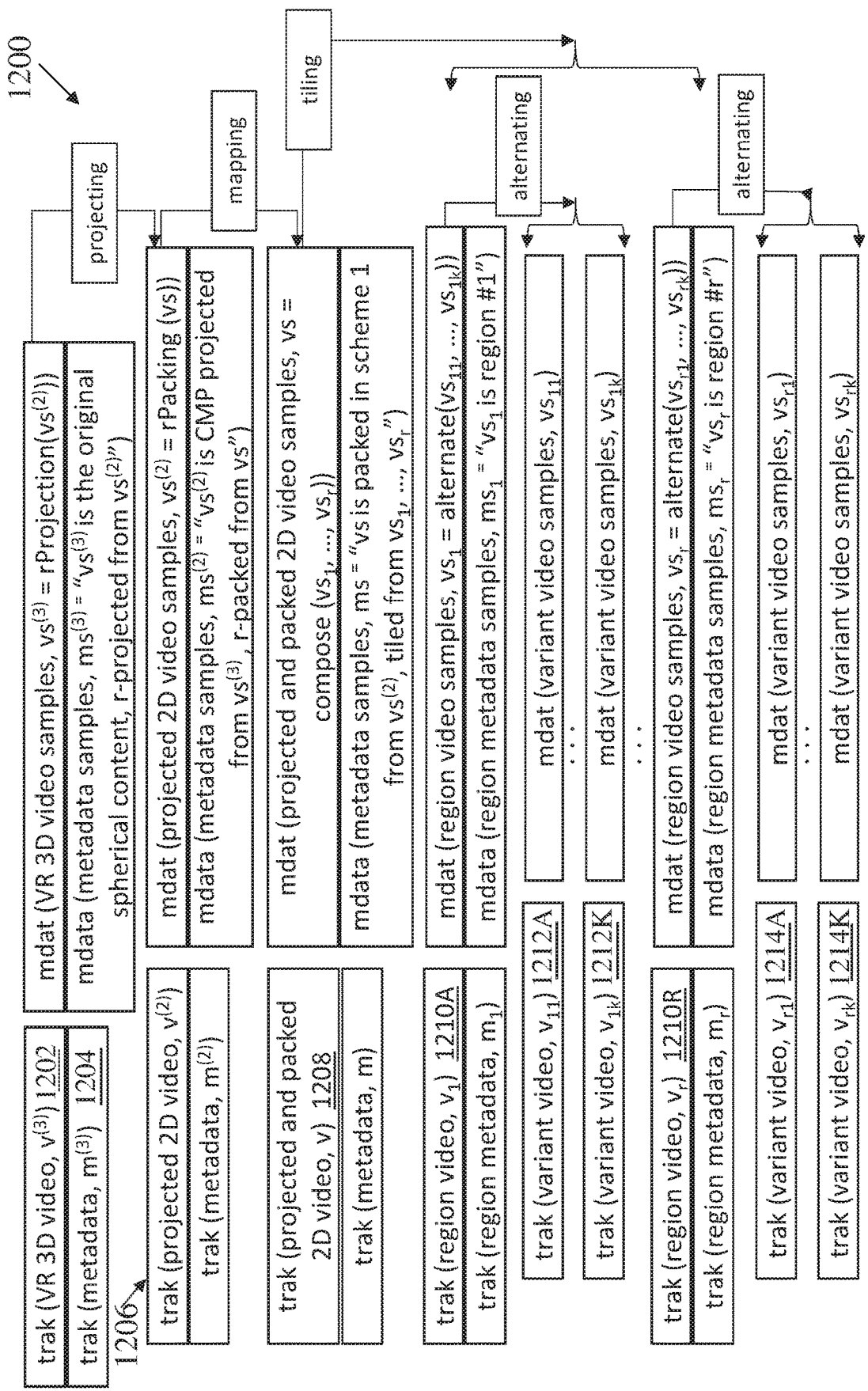
FIG. 12 shows an exemplary track hierarchical structure, according to some embodiments.

A flat file structure for the content could be used, for example, for a video track for a single movie. For VR content, there is more content than is sent and/or displayed by the receiving device. For example, as discussed herein, there can be content for the entire 3D sphere, where the user is only viewing a small portion. In order to encode, store, process, and/or deliver such content more efficiently, the content can be divided into different tracks. FIG. 12 shows an exemplary track hierarchical structure 1200, according to some embodiments. The top track 1202 is the 3D VR spherical content track, and below the top track 1202 is the associated metadata track 1204 (each track has associated metadata). The track 1206 is the 2D projected track. The track 1208 is the 2D big picture track. The region tracks are shown as tracks 1210A through 1210R, generally referred to as sub-picture tracks 1210. Each region track 1210 has a set of associated variant tracks. Region track 1210A includes variant tracks 1212A through 1212K. Region track 1210R includes variant tracks 1214A through 1214K. Thus, as shown by the track hierarchy structure 1200, a structure can be developed that starts with physical multiple variant region tracks 1212, and the track hierarchy can be established for region tracks 1210 (sub-picture or tile tracks), projected and packed 2D tracks 1208, projected 2D tracks 1206, and VR 3D video tracks 1202, with appropriate metadata tracks associated them.

In operation, the variant tracks include the actual picture data. The device selects among the alternating variant tracks to pick the one that is representative of the sub-picture region (or sub-picture track) 1210. The sub-picture tracks 1210 are tiled and composed together into the 2D big picture track 1208. Then ultimately the track 1208 is reverse-mapped, e.g., to rearrange some of the portions to generate track 1206. The track 1206 is then reverse-projected back to the 3D track 1202, which is the original 3D picture.

The exemplary track hierarchical structure can include aspects described in, for example: m39971, "Deriving Composite Tracks in ISOBMFF", January 2017 (Geneva, CH); m40384, "Deriving Composite Tracks in ISOBMFF using track grouping mechanisms", April 2017 (Hobart, AU); m40385, "Deriving VR Projection and Mapping related Tracks in ISOBMFF;" m40412, "Deriving VR ROI and Viewport related Tracks in ISOBMFF", MPEG 118th meeting, April 2017, which are hereby incorporated by reference herein in their entirety. In FIG. 12, rProjection, rPacking, compose and alternate represent the track derivation TransformProperty items reverse 'prof', reverse 'pack', 'cmpa' and 'cmp1', respectively, for illustrative purposes and are not intended to be limiting. The metadata shown in the metadata tracks are similarly for illustrative purposes and are not intended to be limiting. For example, metadata boxes from OMAF can be used, w17235, "Text of ISO/IEC FDIS 23090-2 Omnidirectional Media Format," 120th MPEG Meeting, October 2017 (Macau, China), which is hereby incorporated by reference herein in its entirety.

The number of tracks shown in FIG. 12 is intended to be illustrative and not limiting. For example, in cases where some intermediate derived tracks are not necessarily needed in the hierarchy as shown in FIG. 12, the related derivation steps can be composed into one (e.g., where the reverse packing and reverse projection are composed together to eliminate the existence of the projected track 1206).

The techniques can include leveraging a track hierarchy structure (e.g., the hierarchy discussed in conjunction with FIG. 12) to store composition metadata in derived tracks. For example, composition metadata can be stored in the sub-picture tracks 1210, the 2D big picture track 1208, and/or track 1206. Storing the composition metadata in a derived track can reduce the amount of composition metadata that needs to be stored. It can be desirable for the composition metadata to specify, for example, support of binocular disparity rendering and/or content overlay rendering with features such as transparency/opacity. Some techniques specify such composition metadata using an in-track (e.g., item property) metadata box. For example, if there are five overlays in the background, then each of the five tracks carries the composition metadata. If the composition metadata is carried in a derived track according to the techniques discussed herein, then it can be specified in just the derived track. The composition metadata in the derived track can be used, either alone and/or together with other spatial and temporal information, to perform overlays using the derived visual track. For example, the "Technologies under Consideration for ISOBMFF," N17379, Gwangju, Korea (January 2018), which is hereby incorporated by reference herein in its entirety, specifies techniques for performing overlay using derived visual tracks.

In the TuC, options have been proposed for derived visual tracks. For a sample entry of a derived visual track, the DerivedVisualSampleEntry 300 shown in FIG. 3A can be used to specify a sample entry of a derived visual track, which specifies a DerivedTrackConfigRecord derived_config_rec 302. The derived track configuration record can be specified using a box type of DerivedTrackConfigRecord, for which the container is the DerivedTrackSampleEntry.

The semantics of the derived track configuration record can be specified in various ways. One exemplary option for the semantics of the derived track configuration record includes: a field (e.g., entity_byte_len_minus1) that can be used to indicate the number of bytes used in certain syntax elements of the sample structure of derived samples (e.g., entity_byte_len_minus1 plus 1); a field (e.g., sample_offset_byte_len) that can indicate the number of bytes for the sample_offset field in the sample structure of derived samples; an array of zero or more four-character codes can be included (e.g., operation_4cc[ ]), each of which identifies a transform property; and one or more reserved fields. A second exemplary option of the semantics of the derived track configuration record is shown in FIG. 3B. The semantics can include a DerivedTrackConfigRecord class that extends Box, which includes an array of integers (e.g., property_type[ ]) that specify each transform property (e.g., as discussed in the TuC, incorporated by reference herein); and an array of zero or more four-character codes can be included (e.g., operation_4cc[ ]), each of which identifies a transform property.

The syntax of a sample of a derived visual track can be specified in various ways. A first exemplary option is the TransformProperty syntax 400 shown in FIG. 4A. The field num_inputs 402 specifies the number of input entities for this image operation. When num_inputs 402 is equal to 0, the image operation is non-essential, otherwise the image operation is essential. The field entity_idx 404 is a 1-based index to the TrackReferenceTypeBox of type 'dtrk'. When the entity_idx 404 points to an ID value that resolves to a track ID, the function IsTrack(entity_idx) 406 is specified to return 1, and otherwise the function IsTrack(entity_idx) 406 is specified to return 0. The sample_offset 408 is present only if entity_idx 404 refers to a track and sample_offset_byte_len 410 is greater than 0, and it encodes the offset of the sample (positive or negative) with respect to the decode time of the derived sample. When not present, sample_offset 408 is inferred to be equal to 0. The TransformProperty 400 extends FullBox and is therefore a full box, which indicates the operation to be performed on the inputs listed in the containing ImageOperation 412 structure.

A second exemplary option of the syntax of a sample of a derived visual track is the TransformProperty syntax 450 shown in FIG. 4B. The num_inputs 452 specifies the number of input entities for this image operation. The track_ref_index_or_zero 454 is either a 1-based index to the TrackReferenceTypeBox of type 'dtrk', or the value 0 to indicate the output of the preceding ImageOperation. The TransformProperty 450 extends FullBox and is therefore a full box, which indicates the operation to be performed on the inputs listed in the containing ImageOperation structure.

The inventors have discovered and appreciated drawbacks with using the different syntaxes discussed herein. In some embodiments, the first exemplary option of the syntax for the sample entry can be paired with the first exemplary option of the syntax for the sample of derived visual track shown in FIG. 4A for track derivation, with the calculated sample offset information for input sample selections. In some embodiments, the second exemplary option of the syntax for the sample entry can be paired with the second exemplary option of the syntax for the sample of derived visual track shown in FIG. 4B for track derivation with default input sample selections. The paired first exemplary options uses more parameters, and thus uses more bytes/bits to signal relevant information. The paired second exemplary options has a simple syntax and uses less bytes/bits. However, for a major application (e.g., where the tracks in a file are sub-pictures partitioned directly from a larger frame of a video or image sequence), the paired second exemplary options may work more efficiently. For example, all tracks may be of a same time line with the same lengths, and may be composition aligned for presentation. The paired first exemplary options may work flexibly for applications in which the tracks in a file may be pictures/sub-pictures generated from multiple videos or image sequences that they may have different time lines and lengths. For some examples where the tracks may not have a same timeline, it can be desirable to solve the alignment issue. Therefore, the inventors have determined that existing techniques have associated disadvantages, and are not flexible enough to address the various scenarios needed for video coding.

The techniques described herein provide for a new syntax that can provide benefits and flexibility that cannot be otherwise achieved through the syntaxes currently proposed for ISOBMFF. The techniques can include overlay composition metadata within a derived track (e.g., as discussed in conjunction with FIG. 12O. The syntax can be used, for example, for a derived track composition that takes multiple inputs with a sample offset. The offset(s) can be specified in the derived track.

FIG. 5 provides a syntax 500 for a sample entry of a derived visual track, according to some embodiments. For illustrative purposes, an example can include a DerivedVisualSampleEntry class 501, which extends VisualSampleEntry, which will be used to explain the concepts herein, although one of skill can appreciate that other nomenclatures, structures, and/or fields can be used without departing from the spirit of the invention. The sample_offset_flag 502, if set to 1 indicates the calculation of sample_offset is present, otherwise sample_offset is inferred to be equal to 0. The reserved field 504 shall be equal to 0. The DerivedTrackConfigRecord config_rec 506 can be specified using the syntax discussed in conjunction with FIG. 6. In contrast to existing derived visual track syntaxes, the syntax 500 includes additional fields to the DerivedTrackConfigRecord 506. For example, as shown in FIG. 3A, the syntax 300 only includes the DerivedTrackConfigRecord 302. As shown in FIG. 5, the syntax 500 additionally includes the sample_offset_flag 502 and the reserved field 504. As discussed further in conjunction with FIGS. 6 and 7A-7B, the sample_offset_flag 502 can allow parameters to be included and/or controlled in other syntaxes based on whether there is a sample offset.

FIG. 6 provides a syntax for a DerivedTrackConfigRecord 600, according to some embodiments. The DerivedTrackConfigRecord 600 can be included (e.g., mandatory) in a track containing a DerivedTrackSampleEntry. The entity_byte_len_minus1 602 can indicate, when adding 1, the number of bytes used in certain syntax elements of the sample structure of derived samples. The sample_offset_byte_len 604 can indicate the number of bytes for the sample_offset field in the sample structure of derived samples. The reserved field 606 can be equal to 0. The operation_4cc[ ] 608 is an array of zero or more four-character codes, each of which identifies a transform property.

As shown by the syntax in FIG. 6, the inclusion of the entity_byte_len_minus1 602, the sample_offset_byte_len 604, and the reserved field 606 can be controlled based on the sample_offset_flag (e.g., the sample_offset_flag 502 in FIG. 5). Use of the sample_offset_flag in this manner can provide flexibility for the DerivedTrackConfigRecord not otherwise available using existing techniques. For example, the functionality of both the first exemplary option and the second exemplary option for specifying a sample entry of a derived visual track discussed above can be incorporated into the single DerivedTrackConfigRecord 600 shown in FIG. 6.

To achieve flexibility not otherwise available with prior techniques, the DerivedTrackConfigRecord 600 can influence the fields provided in other data structures. FIGS. 7A and B provide a syntax 700 for a sample of a derived visual track, according to some embodiments. For illustrative purposes, FIG. 7A shows an example of an ImageOperation class and FIG. 7B shows an example of a DerivedSample class, which will be used to explain the concepts herein, although one of skill can appreciate that other nomenclatures, structures, and/or fields can be used without departing from the spirit of the invention. The num_inputs 702 specifies the number of input entities for the ImageOperation 704. When num_inputs 702 is equal to 0, the image operation is non-essential, otherwise the image operation is essential. The entity_idx 706 can be a 1-based index to the TrackReferenceTypeBox of type 'dtrk'. When entity_idx 706 points to an ID value that resolves to a track ID, the function IsTrack(entity_idx) 708 is specified to return 1, and otherwise the function IsTrack(entity_idx) 708 is specified to return 0. In some embodiments, when the sample_offset_flag (e.g., the sample_offset flag 502 in FIG. 5) is equal to 0, the value 0 can be used to indicate the output of the preceding ImageOperation.

The sample_offset 710 can be present if entity_idx 706 refers to a track and sample_offset_byte_len (e.g., sample_offset_byte_len 604 in FIG. 6) is greater than 0. If present, the sample_offset 710 encodes the offset of the sample (positive or negative) with respect to the decode time of the derived sample. When not present, sample_offset 710 can be inferred to be equal to 0. When the sample_offset_flag (e.g., the sample_offset_flag 502 in FIG. 5) is equal to 0, the sample_offset 710 can be inferred to be equal to 0. The num_samples 712 can specify the number of samples for this image operation. Num_samples 712 can be used to set the upper bound of sample numbers subject to the function EndOfSample( ) 714 for the input entities which detects the last sample in the sample entry. The TransformProperty 716 can be a full box, which can indicate the operation to be performed on the inputs listed in the containing ImageOperation structure.

Generally, the syntax 700 can provide combined functionality for the sample not otherwise available with existing techniques. For example, as a general summary the portions 700A and 700C of the syntax 700 can be used where the tracks in a file are sub-pictures partitioned directly from a larger frame of a video or image sequence. As another example, the portions 700B and 700C can be used to work flexibly for applications in which the tracks in a file may be pictures/sub-pictures generated from multiple videos or image sequences that may have different time lines and lengths. The syntax 700 can be controlled using the sample_offset_flag, e.g., which is used to determine whether to enter portion 700A or 700B.

Compositions can be performed in various ways. For example, various sections in the TuC address track composition, such as the sections on Track Overlay Composition (Section 2.7 of the TuC), Transformation Matrix Composition (Section 2.11 of the TuC), and their combination (Section 2.12 of the TuC), plus Track Grouping Composition (Section 2.13 of the TuC). A consideration for compositions can be the order of the visual tracks for the composition. For example, the layer parameter in the track header TrackHeaderBox of each track can specify the front-to-back ordering of visual tracks.

Generally, each of tracks referenced by a derived visual track may carry corresponding metadata and/or parameters when it is generated. Dealing with such track metadata may require additional consideration and/or processing for the track compositions. Regarding the track composition with the track derivation techniques discussed above, for simplicity it can be assumed the metadata (e.g. the layer parameter and/or other parameters) in the track header is valid, and may be used directly during the composition processing. However, the inventors have discovered and appreciated that there may be cases in which the layer number may not be set meaningfully (e.g., such as after track generation and/or track editing). For example, for certain types of track media data, such as a thumbnail, a logo, a preview, or media data from other files, the media data may not have the specified layer. Additionally, or alternatively, the derived track composition processing may change the layer information. For example, the derived track composition processing may change the relative layer characteristics from the original layer number settings, and/or may adjust the relative layer ordering when depth information is provided with the visual tracks.

The inventors have developed improvements to existing technology for specifying the syntax and semantics of the layer. The techniques can optionally be used in conjunction with the syntaxes discussed above, such as in conjunction with the syntax discussed in conjunction with FIGS. 5-7B. For exemplary purposes, the syntax is shown in use with the syntax introduced in FIGS. 5-7B, although this is not intended to be limiting. FIG. 8A provides a syntax 800 for a sample entry of a derived visual track, according to some embodiments. For illustrative purposes, an example can include the derived visual sample entry 'dtrk' as shown in FIG. 8A, which will be used to explain the concepts herein, although one of skill can appreciate that other nomenclatures, structures, and/or fields can be used without departing from the spirit of the invention. The syntax 800 includes aspects of the syntax 500 in FIG. 5, which is indicated in FIG. 8A by maintaining the same reference characters where relevant from FIG. 5. The syntax 800 includes the addition of the layer_flag 802. If the layer_flag 802 is set to 1, the layer_flag 802 indicates the setting of the layer is present, otherwise the layer for the track is inferred to be the same in the TrackHeaderBox of the track. The reserved field 504 in the syntax 500 included seven bits, while the reserved field 804 in syntax 800 is reduced by one bit to allocate the bit to the layer_flag 802.

FIG. 8B provides an exemplary syntax 800 for a sample of a derived visual track, according to some embodiments. For illustrative purposes, an example can include an ImageOperation class, which will be used to explain the concepts herein, although one of skill can appreciate that other nomenclatures, structures, and/or fields can be used without departing from the spirit of the invention. The syntax 800 includes many aspects of the syntax 700 in FIG. 7A, which is indicated in FIG. 8B by maintaining the same reference characters where relevant from FIG. 7. As shown by portions 800A and 800B of the syntax 800, if the layer_flag (e.g., the layer_flag 802 from FIG. 8A) is equal to 1, then the layer field 806 is present. The layer field 806 specifies the front-to-back ordering of video tracks. In some embodiments, tracks with lower numbers for the layer field 806 are closer to the viewer. For example, 0 is the normal value, and −1 would be in front of track 0, and so on. If the present, layer field 806 can override the layer number in the TrackHeaderBox of the track.

Advantageously, the layer field can be included to provide layering of multiple input tracks for a composition in the spatial domain. The techniques described herein can be used to redefine the layer parameter for a track. For example, the layer can be redefined where otherwise with prior technologies the layer from the track header box could be invalid and/or need to be updated, as described herein.

The inventors have discovered and appreciated that for applications with immersive media content, there may be more devices, such as source devices, sync devices, and/or rendering devices involved in an end-to-end system than contemplated in existing standards and/or techniques. Existing composition techniques often do not support desired composition use cases, such as those that require sophisticated compositions. For example, some composition use cases require more sophisticated compositions for a final presentation than are supported using existing techniques.

The inventors have developed techniques to specify additional composition metadata, such as composition metadata aligned in time, space location, object layer ordering, and/or the like for immersive media applications.

In some embodiments, the techniques can include a new metadata box type for immersive media. For illustrative purposes, an example can include a metadata box type that can be referred to as the "immc" box type, which will be used to explain the concepts herein, although one of skill can appreciate that other nomenclatures, structures, and/or fields can be used without departing from the spirit of the invention. The immc box can be contained within a VisualSampleEntry ('dtrk'). The box can be mandatory for compositing media tracks. In some embodiments the box can provide configuration information for compositing one or more sources for presentation. The media track can be a derived visual track (e.g., as described in the TuC for ISOBMFF), such that a derived track carries the immersive media metadata.

Figure 9:
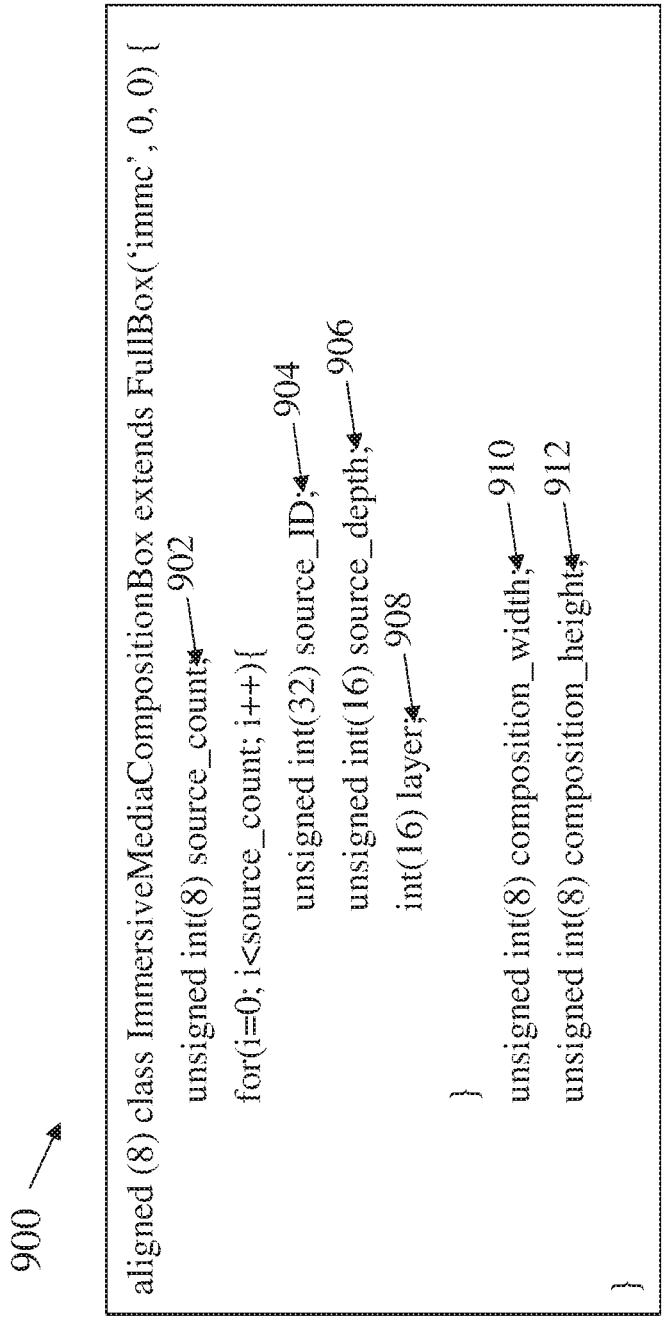
FIG. 9 shows an exemplary syntax for an immersive media box, according to some embodiments.

FIG. 9 shows an exemplary syntax 900 for an immersive media box, according to some embodiments. The source_count 902 specifies the number of sources in the composition. The source_ID 904 specifies an ID value, such as an ID value from a list (e.g., in TrackReferenceTypeBox with a reference_type equal to 'dtrk'). The ID value can be of the track ID values of the tracks used by derived samples in the track, the item ID values of image items used by derived samples of the track, and/or the like. The source_depth 906 can indicate a minimum image depth of the containing stereoscopic content, when StereoVideoBox is present. For example, the source_depth 906 can be specified from the viewpoint to the perceived stereoscopic image. In some embodiments, the source_depth 906 can be relative to a unit sphere. In some embodiments, the source_depth 906 can be specified in units of $2^{-16}$. In some embodiments, the source_depth 906 may be referenced in compositing applications for effective overlay processing with transparency for the composition picture. The layer 908 can be used to specify an ordering, such as a front-to-back ordering, of video tracks. In some embodiments, tracks with lower layer 908 numbers are closer to the viewer. In some embodiments, 0 is the normal value, and −1 would be in front of track 0, and so on. The layer 908 can override the layer number in the TrackHeaderBox. In some embodiments, a compositing application may use the layer number for overlay processing with transparency for the composition picture. The composition_width 910 can specify the width of the composition picture (e.g., in luma sample units). The composition_height 912 can specify the height of the composition picture (e.g., in luma sample units).

In some embodiments, the composition metadata can signal how many tracks to use for the composition (e.g., as a source_count 902). The techniques can also include new fields such as a source_depth 906. For example, when performing composition with 3D content, the basic source depth can be signaled for the composition. The techniques can be used, for example, for MPEG-I Phase 1b to specify composition-related metadata. As discussed herein, the techniques can include the composition metadata in a derived track.

As discussed herein, for applications with immersive media content or huge frame size content, there may be a plurality of source devices and rendering devices involved in an end-to-end system. Various spatial and temporal compositions of multiple media sources may be specified for final presentations to the user. The inventors have discovered and appreciated that it is desirable to specify composition metadata that is aligned in time, space location, object layer ordering, and/or the like in order to support desired compositions.

A primary source can refer to the main source used for a presentation. The primary source can be, for example, an entire view, a global view, 360 degree media, and/or the like. A secondary source is often used to refer to a source that is different than the primary source. For example, the secondary source can be an additional local view, a smaller view, a sub-picture view, and/or the like. The secondary source can be overlaid and displayed as foreground content to the primary source. The overlay content can be, for example, a logo, a sign language interpreter, a thumbnail (e.g., as a recommended viewport), a picture-in-picture (PIP) (e.g., for a preview or overview with respect to a current viewport), an ad, timed text, and/or the like. Overlay content can be specified in a viewport relative display mode, such that the overlay is specified in relation to the viewport. Overlay content can be specified globally, such as ad insertion or timed text, or other content. In some embodiments, multiple overlay content can be used, such that the overlay of the secondary content can be specified with respect to other secondary content. For example, a logo can be overlaid such that it is always on top of another secondary source.

The sources, including both primary and secondary sources, can be captured as different types, including as monoscopic or stereoscopic types. The primary source can be one type, while the secondary source(s) can be the same type or a different type. For example, a monoscopic primary source can be overlaid with either monoscopic and/or stereoscopic secondary content. Various rendering options can be used for overlay, such as a burn-in overlay, timed text support (e.g., as specified in OMAF), burn-in overlay with additional options (e.g., transparency or opacity), timed text support with additional options (e.g., transparency or opacity), and/or the like. For example, when the secondary source is a monoscopic source (e.g., when overlaid on either a monoscopic or stereoscopic primary source), the rendering options can include burn-in overlay, timed text support, burn-in overlay with additional options, and timed text support with additional options. As another example, when the secondary source is a stereoscopic source (e.g., when overlaid on either a monoscopic or stereoscopic primary source), the rendering options may include timed text support and timed text support with additional options. For example, a burn-in overlay may not be supported since the stereoscopic effect of the secondary content may be broken if an object in the scene is perceived to be in front of the overlay region.

The inventors have developed techniques for specifying composition metadata for separate primary and secondary sources (e.g., sources that are contained in separate streams or independent tracks in an ISOBMFF file) using a track grouping. When separate primary and secondary sources are related, such as being composition-time aligned, the inventors have developed techniques that can use a track grouping scheme to specify overlay metadata.

In some embodiments, an overlay relationship can be specified for a track group. For illustrative purposes, an example can include an OverlayRelationshipDescriptionBox that extends the TrackGroupTypeBox with a track_group_type, which will be used to explain the concepts herein, although one of skill can appreciate that other nomenclatures, structures, and/or fields can be used without departing from the spirit of the invention. The OverlayRelationshipDescriptionBox can include various fields. The fields may be present or absent depending on the metadata in the associated track. For example, if there is no associated OverlayRelationshipGroupEntry in the associated track, discussed below, then the fields may be present. This may be the case if, for example, the track has a constant, static overlay mode (e.g., in terms of fields relative_to_viewport_flag, relative_disparity_flag, and depth_included_flag, discussed further below). As another example, if there is one or more associated OverlayRelationshipGroupEntry boxes, then the fields may not be present. This may be the case if, for example, the track has a dynamic overlay mode.

FIG. 10 shows an exemplary syntax for specifying an overlay relationship 1000, according to some embodiments. For illustrative purposes, an example can include an overlay relationship 1000 specifies an 'ovlr' grouping_type 1002, which will be used to explain the concepts herein, although one of skill can appreciate that other nomenclatures, structures, and/or fields can be used without departing from the spirit of the invention. The relative_to_viewport_flag 1004 specifies how the overlays are to be rendered. A value of 1 can indicate that the overlay is expected to be present on the display screen (e.g., the overlay is visible independently of the viewing direction of the user). A value of 0 can indicate that the overlay is expected to be rendered at a certain position on the sphere (e.g., the overlay is only visible when the user is looking in the direction where the overlay is rendered). The relative_disparity_flag 1006 can indicate whether the disparity is provided as a percentage value of the width of the display window for one view (e.g., when the value is equal to 1) or as a number of pixels (e.g., when the value is equal to 0). The depth_included_flag 1008 can indicate whether the depth (e.g., z-value) of regions on which to overlay content is present (e.g., 1 can indicate that the depth of regions on which the overlay is to be rendered is present, whereas 0 indicates it is not present).

FIG. 11A shows an exemplary syntax for specifying an overlay relationship sample group 1100, according to some embodiments. In some embodiments, an example of an overlay relationship sample group can include an OverlayRelationshipGroupEntry that extends the VisualSampleGroupEntry as shown in FIG. 11A, which will be used to explain the concepts herein, although one of skill can appreciate that other nomenclatures, structures, and/or fields can be used without departing from the spirit of the invention. The overlay relationship sample group 1100 can be used (e.g., in conjunction with a provided overlay relationship 1000) to define how the track group is composed. For example, the 'olrd' grouping_type for the sample grouping can be used to provide information such as overlay features, positions, and/or sizes of the samples from a visual track in an overlay relationship track group. In some embodiments, the SampleToGroupBox (e.g., version 1) can be used when the grouping_type is equal to 'olrd.' The value of the grouping_type_parameter can be equal to the track_group_id of the corresponding overlay relationship track group.

In some embodiments, the overlay construction associated with the overlay relationship track group can be specified by forming the tracks that belong to the same 'ovlr' track group into subgroups such that each subgroup contains tracks in the same alternate group. One track can be selected from each of those subgroups. In some embodiments, for each composition-time aligned sample of each of the selected tracks, the overlay processing can be performed in the front-to-back order specified by overlay_region_depth, or layer in terms of the depth_included_flag.

The overlay_region_count 1102 can specify the number of overlay regions for which a placement inside the sphere is provided. Each region can be identified by an identifier.

The overlay_region_id 1104 can provide the identifier of the overlay region. The overlay_region_id 1104 may be associated with, for example, a description or purpose of the overlay content (e.g., a logo, Ad, thumbnail, background visual media, and/or the like).

The overlay_region_opacity 1106 can specify the opacity (or conversely, the transparency) level to be applied for the overlay. The overlay_region_opacity 1106 can be an integral value ranging between [0,100]. The overlay_region_opacity 1106 can correspond to a float value as the Alpha value ranging [0.00, 1.00].

The disparity_in_percent 1108 can indicate the disparity as a fraction of the width of the display window for one view (e.g., in units of $2^{-16}$). The disparity_in_percent 1108 may be negative, in which case the displacement direction can be reversed. The disparity_in_percent 1108 can be used to displace the region to the left on the left eye view and to the right on the right eye view. The disparity_in_pixels 1110 can indicate the disparity in pixels. The disparity_in_pixels 1110 may be negative, in which case the displacement direction can be reversed. The disparity_in_pixels 1110 is used to displace the region to the left on the left eye view and to the right on the right eye view.

The centerAzimuth_offset_percent 1112 and centerElevation_offset_percent 1114 can specify the azimuth and elevation offset from a base, such as the centerAzimuth and centerElevation of the SphereRegionStruct( ), respectively, in percentage. The width_percent 1116 and height_percent 1118 can specify the overlay width and overlay height, respectively, e.g., in units of $2^{-16}$, as a fraction of the width and height of the display window. In some embodiments, the overlay may imply a scaling processing to fulfill this placement.

The SphereRegionStruct( ) 1120 can indicate a sphere location that can be used, together with other information, to determine where the overlay is placed and displayed in 3D space. In some embodiments, the vector between the center of the sphere and the sphere location specified by the SphereRegionStruct( ) 1120 can be a normal vector to the rendering 3D plane on which the overlay is to be rendered. FIG. 11B shows a sphere 1150 with a specified rendering plane 1156, according to some embodiments. The SphereRegionStruct( ) 1120 can specify a vector 1154 from the center 1152 of the sphere 1150 that is a normal vector to the rendering 3D plane 1156. A decoding device can use the information specified by the SphereRegionStruct( ) 1120 (e.g., and other information, such as the depth of the 3D plane) to determine the position of the rendering 3D plane in 3D space on which the overlay is to be rendered. There may be cases that multiple planes (e.g., rendering 3D planes 1156 shown in FIG. 11B) appear as overlay regions for the multiple layer overlay. In such cases, the sphere visual media as the 'background' may be treated as one region layer in the overlay relationship description.

The overlay_region_depth 1122 can indicate the depth (e.g., the z-value) of the region on which overlay is to be rendered. The overlay_region_depth 1122 value can be the norm of the normal vector of the overlay region. The overlay_region_depth 1122 value can be relative to a unit sphere, and can be specified in units of $2^{-16}$. The overlay_layer 1124 can specify the front-to-back ordering of video tracks. For example, tracks with lower numbers can be closer to the viewer. In some embodiments, a value of 0 is the normal value, and −1 would be in front of track 0, and so on. In some embodiments, while not shown in FIG. 11A, a source_depth can be included, as discussed further herein.

As discussed herein, a flat file structure for content could be used, for example, for a video track for a single movie. In order to encode, store, process, and/or deliver such content more efficiently, the content can be divided into different tracks, as discussed in conjunction with the exemplary track hierarchical structure 1200 discussed in conjunction with FIG. 12. As discussed herein, the techniques can include leveraging a track hierarchy structure (e.g., the hierarchy discussed in conjunction with FIG. 12) to store composition metadata in derived tracks (e.g., in the sub-picture tracks 1210, the 2D big picture track 1208, and/or track 1206). Storing the composition metadata in a derived track can reduce the amount of composition metadata that needs to be stored.

FIG. 13 shows an exemplary syntax for an overlay relationship description 1300, according to some embodiments. For illustrative purposes, an example can include a box type 'ovld' 1302, which will be used to explain the concepts herein, although one of skill can appreciate that other nomenclatures, structures, and/or fields can be used without departing from the spirit of the invention. The container can be a VisualSampleEntry ('dtrk'). As discussed herein, the overlay relationship description 1300 can provide configuration information for overlay compositing source(s) for presentation. For composition-time aligned samples referenced in the derived track, the overlay processing can be in a front-to-back order specified by overlay_region_depth 1304, or overlay_layer 1306 depending on the value of the depth_included_flag 1308. The overlay relationship description 1300 can be used in conjunction with, for example, the transform properties for complete overlay processing.

Referring further to the overlay relationship description 1300, the source_count 1310 can specify the number of sources in composition. The source_ID 1312 can specify an ID value from the list (in TrackReferenceTypeBox with reference_type equal to 'dtrk') of both the track ID values of all tracks used by derived samples in the track and the item ID values of all image items used by derived samples of the track. The relative_to_viewport_flag 1314 specifies how the overlays are to be rendered. A value of 1 can indicate that the overlay is expected to be present on the display screen (e.g., the overlay is visible independently of the viewing direction of the user). A value of 0 can indicate that the overlay is expected to be rendered at a certain position on the sphere (e.g., the overlay is only visible when the user is looking in the direction where the overlay is rendered). The relative_disparity_flag 1316 can indicate whether the disparity is provided as a percentage value of the width of the display window for one view (e.g., when the value is equal to 1) or as a number of pixels (e.g., when the value is equal to 0).

The depth_included flag 1318 can indicate whether the depth (e.g., z-value) of regions on which to overlay content is present. A depth_included_flag 1318 equal to 1 can indicate that the depth of regions on which the overlay is to be rendered is present. A depth_included_flag 1318 value equal to 0 can indicate that the depth of regions on which the overlay is to be rendered is not present.

The syntax 1300 can include other various fields, such as the fields discussed above in conjunction with FIG. 11A (e.g., the overlay_region_count 1102, overlay_region_id 1104, overlay_region_opacity 1106, disparity_in_percent 1108, disparity_in_pixels 1110, centerAzimuth_offset_percent 1112, centerElevation_offset_percent 1114, width_percent 1116, height_percent 1118, SphereRegionStruct( ) 1120, overlay_region_depth 1122, and/or overlay_layer 1124). As shown in the syntax 1300 in FIG. 13, the overlay_ region_count 1320 can specify the number of overlay regions for which a placement inside the sphere is provided. Each region can be identified by an identifier. The overlay_region_id 1322 can provide the identifier of the overlay region. The overlay_region_opacity 1324 can specify the opacity (or conversely, the transparency) level to be applied for the overlay. The disparity_in_percent 1326 can indicate the disparity (e.g., in units of $2^{-16}$) as a fraction of the width of the display window for one view. The disparity_in_pixels 1328 can indicate the disparity in pixels. The centerAzimuth_offset_percent 1330 and centerElevation_offset_percent 1332 can specify the azimuth and elevation offset from a base, such as the centerAzimuth and centerElevation of the SphereRegionStruct( ). The width_percent 1334 and height_percent 1336 can specify the overlay width and overlay height, respectively. The SphereRegionStruct( ) 1338 can indicate a sphere location that can be used, together with other information, to determine where the overlay is placed and displayed in 3D space. In some embodiments, the vector between the center of the sphere and the sphere location specified by the SphereRegionStruct( ) 1338 can be a normal vector to the rendering 3D plane on which the overlay is to be rendered (e.g., as discussed in conjunction with FIGS. 11A-11B). The overlay_region_depth 1304 can indicate the depth (e.g., the z-value) of the region on which overlay is to be rendered. The overlay_layer 1306 can specify the front-to-back ordering of video tracks. For example, tracks with lower numbers can be closer to the viewer.

The source_depth 1340 can indicate a minimum image depth (e.g., from the viewpoint to the perceived stereoscopic image) of the containing stereoscopic content, when StereoVideoBox is present. The source_depth 1340 value can be relative to a unit sphere, and can be specified in units of $2^{-16}$. The source_depth 1340 may be referenced in compositing applications to ensure the perceived depth of the overlay region is positioned in front of any object in the scene.

As discussed herein, in some embodiments, if an OverlayRelationshipGroupEntry is present in the associated track, then various OverlayRelationshipDescriptionBox fields are not present. The OverlayRelationshipDescriptionBox can be viewed as a higher level description compared to the OverlayRelationshipGroupEntry. The OverlayRelationshipDescriptionBox can be used for the track grouping. The OverlayRelationshipDescriptionBox can be present if the overlay relationship is static (e.g., such that there is no change during the overlay compositions, therefore no sample grouping is needed). The OverlayRelationshipGroupEntry can be used for a sample grouping. The OverlayRelationshipGroupEntry can be present if the overlay relationship is dynamic (e.g., will change during the overlay compositions) with the track grouping. Therefore, in some embodiments, just one description needs to be used for overlay compositions. For example, one can be used for static overlay relationships (e.g., at the track grouping level) while the other one for dynamic (e.g., at the sample grouping level).

As discussed herein, immersive media content overlays may involve at least a primary media source and one or more secondary media sources. The overlay cases can be complex, such as cases where multiple secondary sources are overlaid on a primary source, possibly on different locations, or one secondary source is overlaid on top of another secondary source. The inventors have developed techniques to specify composition metadata in ISOBMFF using a timed metadata track. For example, the timed metadata track specified in ISOBMFF can be used to carry the composition metadata. The techniques can signal needed overlay metadata in tracks that are different from or external to the overlay media tracks themselves, using a timed metadata track.

Other techniques, such as putting an overlay box (e.g., such as the OverlayStruct contained within ProjectedOmniVideoBox as an item property in an overlay (primary or secondary) track, may have various downsides. For example, using an overlay box may not allow easy personalization of overlaying materials where one (e.g., primary) visual item may be overlaid with different (e.g., secondary) visual items that are dependent on a target end-user. For example, placing overlay information into the visual item track for one (e.g., primary) visual item may prevent, or make it difficult, to replace the overlay information with other overlay information. Additionally, or alternatively, the association of an overlaid (e.g., primary) item with overlaying (e.g., secondary) items may well be one-to-many and dynamic. For example, a (e.g., secondary) item may be chosen or decided after the overlaid (e.g., primary) item is prepared, processed and/or delivered at different stages, including by different stakeholder systems, and possibly with its integrity protected (e.g., which prevents it from being modified).

The techniques provided herein, including using timed metadata tracks to provide composition metadata, can provide more flexibility than existing techniques. For example, the techniques can provide composition metadata without modifying the content of (e.g., primary and/or secondary) media tracks that are to be overlaid, which can allow signaling of overlaying different (e.g., secondary) media content over a same piece of (e.g., primary) media content, can provide flexibility of personalizing overlaying (e.g., secondary) content (e.g., such as advertisement content) without duplicating overlaid (primary) content, and/or the like. The techniques can support primary and secondary sources that are monoscopic visual content, and can be extended to deal with stereoscopic content. For example, the techniques can support stereoscopic content to allow other types of overlays, such as mono over stereo, stereo over mono, and stereo over stereo. The techniques can extend the case of one (mono) to one (mono), to the cases of one to many, many to one, and many to many. The techniques disclosed herein can be applicable to both regular 2D visual media content, as well as 3D immersive VR visual media content (e.g., where it is clear what types of content are carried within related media tracks).

Timed metadata tracks in ISOBMFF can be used to signal overlay metadata and make reference to a list of the associated tracks. For example, the references can be identifiers (IDs) of at least two visual tracks or track groups, with the first track carrying a primary media source and the remaining tracks carrying secondary media sources. The ID order of the tracks or track groups in the list can be used to indicate an overlay order. For example, a track or track group can be overlaid with a directly following track or track group. In some embodiments, when an ID of a track group is presented in the track reference list, the content formed by the content of all tracks in the track group can be the content that is considered for the purpose of overlays. The track group type and the content of the individual tracks in the group can determine how the track group content is formed. For example, if the track group is a sub-picture track group, the group content can be the large picture composed by the sub-picture content of all the sub-picture tracks. Some examples of track references for track overlays can include: a track ID of a (e.g., primary) visual item (e.g. visual track or image sequence), followed by a track ID of a (e.g., secondary) visual item; a track ID of a (e.g., primary) visual item, followed by a list of track IDs of multiple (e.g., secondary) visual items; a track ID of a visual item, followed by a track group ID of (e.g., secondary) visual items; a track group ID of (e.g., primary) visual items, followed by a track ID of a (e.g., secondary) visual item; a track group ID of (e.g., primary) visual items, followed by a list of track IDs of multiple (e.g., secondary) visual items; a track group ID of (e.g., primary) visual items, followed by a track group ID of visual (e.g., secondary) items; and/or the like.

As discussed herein, the techniques can be used for the exemplary case where the primary source is a 3D unit sphere (omnidirectional media) and secondary sources are overlaid onto a number of spherical regions. This exemplary case is discussed as an example of the techniques for illustrative purposes, and is not intended to be limiting. Other cases where the primary source is of another type, such as a 2D plane and/or stereoscopic source can be addressed as well (e.g., with different notions and definitions of regions onto which secondary source content overlays, as desired).

FIG. 14 shows an exemplary syntax for a track overlay sample entry 1400, according to some embodiments. For illustrative purposes, an example can include a syntax specifies a TrackOverlaySampleEntry 'trko' 1402 that extends the MetadataSampleEntry, which will be used to explain the concepts herein, although one of skill can appreciate that other nomenclatures, structures, and/or fields can be used without departing from the spirit of the invention. The fields can include fields discussed herein, such as those in conjunction with FIGS. 10 and 13 (e.g., the relative_to_viewport_flag 1314, relative_disparity_flag 1316, depth_included_flag 1318 and overlay_region_count 1320). As discussed herein, the relative_to_viewport_flag 1404 can specify how the overlays are to be rendered. The relative_disparity_flag 1406 can indicate whether the disparity is provided as a percentage value of the width of the display window for one view (e.g., when the value is equal to 1) or as a number of pixels (e.g., when the value is equal to 0). The depth_included_flag 1408 can indicate whether the depth (e.g., z-value) of regions on which to overlay content is present. The overlay_region_count 1410 can specify the number of overlay regions for which a placement inside the sphere is provided. The overlay_region_count 1410 can be the length of the track reference list, minus one. Each region can be identified by an identifier.

FIG. 15 shows an exemplary syntax for a track overlay sample 1500, according to some embodiments. For illustrative purposes, an example can include the TrackOverlaySample class, which will be used to explain the concepts herein, although one of skill can appreciate that other nomenclatures, structures, and/or fields can be used without departing from the spirit of the invention. The track overlay sample 1500 can include various fields, such as those discussed in conjunction with FIG. 11A (e.g., overlay_region_opacity 1106, disparity_in_percent 1108, disparity_in_pixels 1110, centerAzimuth_offset_percent 1112, centerElevation_offset_percent 1114, width_percent 1116, height_percent 1118, SphereRegionStruct( ) 1120, overlay_region_depth 1122 and/or overlay_layer 1124). Referring to the syntax shown in FIG. 15, the overlay_region_opacity 1502 can specify the opacity or transparency level to be applied for the overlay. The disparity_in_percent 1504 indicates the disparity, e.g., in units of $2^{-16}$, as a fraction of the width of the display window for one view. The disparity_in_pixels 1506 indicates the disparity in pixels. The centerAzimuth_offset_percent 1508 and centerElevation_offset_percent 1510 can specify the azimuth and elevation offset from a base (e.g., such as the centerAzimuth and centerElevation of the SphereRegionStruct( ). The width_percent 1512 and height_percent 1514 can specify the overlay width and overlay height, respectively, as a fraction of the width and height of the display window. The SphereRegionStruct( ) 1516 indicates a sphere location that can be used, together with other information, to determine where the overlay is placed and displayed in 3D space (e.g., as discussed in conjunction with FIG. 11B). The overlay_region_depth 1518 can indicate the depth (e.g., the z-value) of the region on which overlay is to be rendered. The overlay_layer 1520 can specify the front-to-back ordering of video tracks.

In the version 2 draft of OMAF as MPEG-1 Part 2, "[OMAF] Editor's Input Text for OMAF WD," w42932, Tampere, Finland, June 2018, which is hereby incorporated by reference herein in its entirety, the overlay metadata of a visual track or an image item is specified as the 'ovly' box for carriage in ProjectedOmniVideoBox, ItemPropertyContainerBox and the overlay timed metadata track. The draft specifies that the overlay timed metadata track is linked to the respective visual media tracks by utilizing the 'cdsc' track reference. The 'cdsc' is generally used for ISOBMFF track references. Also as specified in Section 8 of the Image File Format, ISO/IEC 23008-12, N16657, 2015, which is hereby incorporated by reference herein in its entirety, metadata items can be linked to the images they describe by item references of type 'cdsc,' and timed metadata tracks may be used to define metadata for image sequences, which can be linked to the image sequence by a track reference of type 'cdsc.' Therefore, for example, for an image item in an overlay processing with the corresponding overlay metadata, 'cdsc' may not be simply used as a reference link for an image item in overlay processing.

The inventors have developed improvements to existing technology that can be used when image items are involved with visual media tracks in the overlay processing. If the overlay is an image and not a video, an image item does not have time information. The inventors have developed techniques to generate metadata to associate an image with the timed track. In some embodiments, the techniques can use image items to specify the time metadata for an image item. An image item for the overlay processing can be part of an image sequence track, and the image sequence track may contain only one or more images with associated advisory timing metadata for the image sequence. The overlay timed metadata track may be linked to the respective image sequence tracks by utilizing the 'cdsc' track reference. The overlay item property box, OverlayConfigProperty 'ovly,' can be contained in ItemPropertyContainerBox (e.g., as specified in the version 2 draft of OMAF as MPEG Part 2). The OverlayConfigProperty can store static metadata of the overlays contained in an associated image item. For example, the static metadata can be specified using an OverlayStruct( ).

In some embodiments, a visual equivalence entry can be used to specify time information for an image item for an overlay. An image item for the overlay processing can be one of multiple image items in a file. The image item can be related to a position in the timeline of a track. For the overlay processing, the image item can be related to a visual media track in the overlay processing. For example, as described in the Image file format, the 'eqiv' sample grouping can be used to set up the relationship between the image item and the visual media track. The samples marked by an 'eqiv' sample group can be 'equivalent' to each other, and/or to the items in an entity group with group_id equal to the grouping_type_parameter of the sample group. The identified time, in the media timescale of the track, for the image item(s) of the associated 'eqiv' entity group can be specified as:

$$T = C + O/(M/256) \qquad \text{Equation 1}$$

Where
C is the composition time of the associated sample;
S is the media timescale of the track;
O is time_offset; and
M is timescale_multiplier.

The visual equivalence entry in the 'eqiv' sample can include the time_offset and the timescale_multiplier. The time relationship to the visual media track as the visual equivalence entry in image items can be used for presenting image items in the overlay processing.

The techniques discussed herein can be used when encoding multimedia content, and can be processed when decoding multimedia content. When encoding multimedia content, an encoding device can use the techniques described herein to provide overlay composition metadata in the encoded multimedia content. When decoding multimedia content, a decoding device can decode the multimedia content by determining the overlay composition metadata, and using the overlay composition metadata to perform overlay compositions for the multimedia data.

Figure 16:
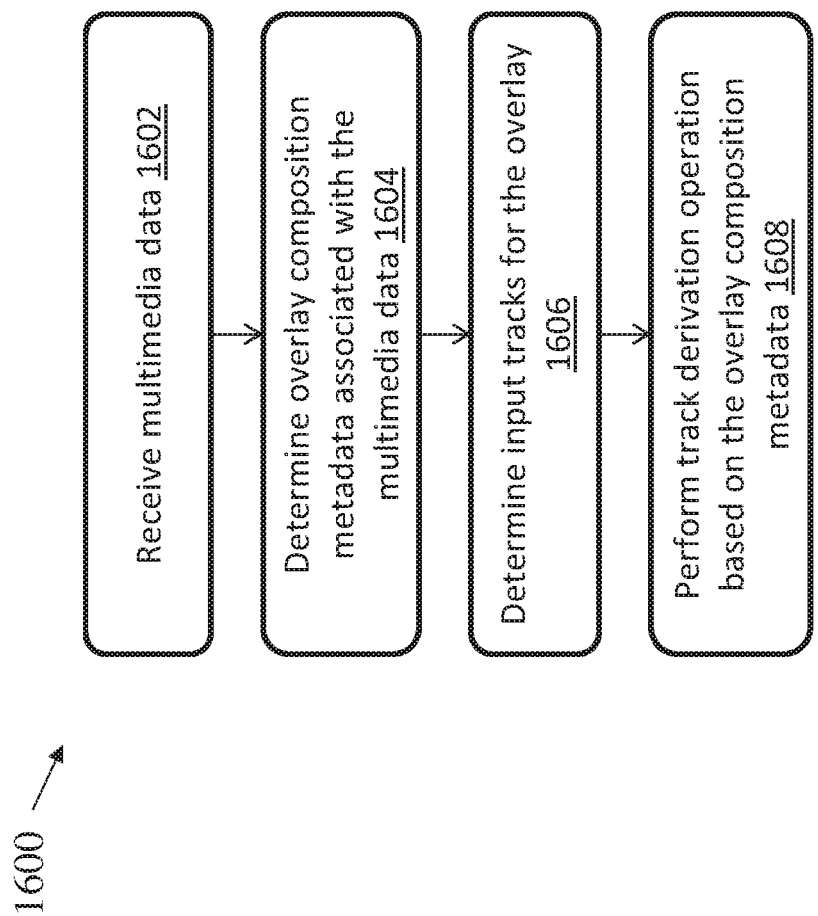
FIG. 16 is an exemplary flow chart of a computerized method for decoding video data, according to some embodiments.

FIG. 16 is an exemplary flow chart of a computerized method 1600 for decoding video data, according to some embodiments. At step 1602, the decoding device receives multimedia data. As discussed herein, the multimedia data can be encoded in a hierarchical track structure (e.g., as discussed in conjunction with FIG. 12. The hierarchical track structure can include a plurality of tracks, including at least a first track and a second track. The first track is at a first level in the hierarchical track structure, and the second track is at a second level in the hierarchical track structure above the first level of the first track.

At step 1604, the decoding device determines overlay composition metadata associated with the second track. The overlay composition metadata can include offset metadata, layer metadata, source metadata, and/or the like, as described herein. At step 1606, the decoding device determines, based on the second track, a set of one or more input tracks. The media tracks can include, for example, media content for an overlay composition.

As discussed herein, referring to steps 1604 and 1606, various types of overlay composition metadata can be provided in the derived track. In some embodiments, the overlay composition metadata comprises offset metadata that can specify whether an offset is provided for the media content (e.g., discussed in conjunction with FIGS. 5-7B). In some embodiments, the overlay composition metadata comprises layer metadata. The layer metadata can specify whether a layer parameter is set (e.g., or whether it should be inferred from a different field) (e.g., as discussed in conjunction with FIGS. 8A-8B). In some embodiments, the overlay composition metadata can include source metadata. The source metadata can include, for example, a source count that specifies the number of input tracks, and a source depth that specifies a depth for three-dimensional content, and/or other information (e.g., a composition width and height) (e.g., as discussed in conjunction with FIGS. 9-10). In some embodiments, the overlay composition metadata includes overlay relationship description metadata. The overlay relationship description metadata can specify, for each input track, overlay metadata specific to the associated input track (e.g., as discussed in conjunction with FIG. 13).

At step 1608, the decoding device performs a track derivation operation on the input tracks based on the overlay composition metadata. For example, the track derivation operation can include performing, based on the overlay composition metadata, an overlay composition of the input tracks to generate the media data of the second track, such that the second track is a derived track of the first track. In some embodiments, the decoding device can determine, based on offset metadata in the overlay composition metadata, whether an offset is specified for each of the one or more input tracks. If the decoding device determines that an offset is specified for each of the one or more inputs, the decoding device can perform the overlay composition based on the offset of each of the one or more input tracks. If the overlay composition metadata includes layer metadata, the decoding device can determine, based on the layer metadata, whether a layer is specified for each of the one or more inputs. For example, the layer metadata may redefine a different layer parameter (e.g., in the TrackHeaderBox of the track, as discussed herein). The decoding device can perform the overlay composition based on the layer of each of the one or more input tracks.

In some embodiments, when the overlay composition metadata includes source metadata (e.g., a source count, a source depth, etc.), the decoding device can perform the overlay composition of the input tracks based on the source depth of each of the one or more input tracks. In some embodiments, when the overlay composition metadata includes overlay relationship description metadata, the decoding device can perform the overlay composition using the overlay metadata specified for each of the input tracks.

In some embodiments, the overlay composition metadata can be specified using techniques that do not use derived tracks. For example, the metadata can be specified using track grouping, or timed metadata tracks as discussed herein. When encoded in such a manner, the decoding device can be configured to decode the overlay composition metadata accordingly (e.g., based on the track grouping or timed metadata tracks), and compose the multimedia data according to the determined overlay composition metadata.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A decoding method for decoding video data, the method comprising:
    receiving multimedia data comprising a hierarchical track structure comprising at least a first track and a second track, wherein:
        the first track is at a first level in the hierarchical track structure and comprises first video media data; and
        the second track is at a second level in the hierarchical track structure above the first level of the first track and does not comprise any video media data;
    determining overlay composition metadata associated with the second track, wherein the overlay composition metadata comprises offset metadata, layer metadata, source metadata, or some combination thereof; and
    performing a track derivation operation on the first video media data associated with the first track, comprising performing, based on the overlay composition metadata, an overlay composition of the first video media data associated with the first track to generate second video media data of the second track such that the second track is a derived track of the first track.

2. The decoding method of claim 1, wherein:
    the overlay composition metadata comprises the offset metadata; and
    the first video media data of the first track comprises one or more input tracks for the composition; and
    the method further comprises determining, based on the offset metadata, whether an offset is specified for each of the one or more input tracks.

3. The decoding method of claim 2, further comprising:
    determining, based on the offset metadata, the offset is specified for each of the one or more input tracks; and
    performing the overlay composition of the first video media data comprises performing the overlay composition based on the offset of each of the one or more input tracks.

4. The decoding method of claim 1, wherein:
    the overlay composition metadata comprises the layer metadata; and
    the first video media data of the first track comprises one or more input tracks for the composition; and
    the method further comprises determining, based on the layer metadata, whether a layer is specified for each of the one or more inputs.

5. The decoding method of claim 4, further comprising:
    determining, based on the layer metadata, the layer is specified for each of the one or more input tracks; and
    performing the overlay composition of the first video media data comprises performing the overlay composition based on the layer of each of the one or more input tracks.

6. The decoding method of claim 1, wherein:
    the first video media data associated with the first track comprises one or more input tracks for the overlay composition;
    the overlay composition metadata comprises the source metadata, the source metadata comprising a source count that specifies a number of the one or more input tracks and a source depth that specifies a depth for three-dimensional content; and
    performing the overlay composition of the first video media data comprises performing the overlay composition based on the source depth.

7. The decoding method of claim 1, wherein:
the first video media data associated with the first track comprises one or more input tracks for the overlay composition; and
determining the overlay composition metadata comprises determining overlay relationship description metadata, wherein the overlay relationship description metadata specifies, for each input track of the one or more input tracks, overlay metadata specific to the associated input track.

8. An apparatus configured to decode video data, the apparatus comprising a processor in communication with memory, the processor being configured to execute instructions stored in the memory that cause the processor to:
receive multimedia data comprising a hierarchical track structure comprising at least a first track and a second track, wherein:
the first track is at a first level in the hierarchical track structure and comprises first video media data; and
the second track is at a second level in the hierarchical track structure above the first level of the first track and does not comprise any video media data;
determine overlay composition metadata associated with the second track, wherein the overlay composition metadata comprises offset metadata, layer metadata, source metadata, or some combination thereof; and
perform a track derivation operation on the first video media data associated with the first track, comprising performing, based on the overlay composition metadata, an overlay composition of the first video media data associated with the first track to generate second video media data of the second track such that the second track is a derived track of the first track.

9. The apparatus of claim 8, wherein:
the overlay composition metadata comprises the offset metadata; and
the first video media data of the first track comprises one or more input tracks for the composition; and
the processor is configured to execute instructions stored in the memory that cause the processor to determine, based on the offset metadata, whether an offset is specified for each of the one or more input tracks.

10. The apparatus of claim 9, wherein the processor is configured to execute instructions stored in the memory that cause the processor to:
determine, based on the offset metadata, the offset is specified for each of the one or more input tracks; and
perform the overlay composition of the first video media data comprises performing the overlay composition based on the offset of each of the one or more input tracks.

11. The apparatus of claim 8, wherein:
the overlay composition metadata comprises the layer metadata; and
the first video media data of the first track comprises one or more input tracks for the composition; and
the processor is configured to execute instructions stored in the memory that cause the processor to determine, based on the layer metadata, whether a layer is specified for each of the one or more inputs.

12. The apparatus of claim 11, wherein the processor is configured to execute instructions stored in the memory that cause the processor to:
determine, based on the layer metadata, the layer is specified for each of the one or more input tracks; and
perform the overlay composition of the first video media data comprises performing the overlay composition based on the layer of each of the one or more input tracks.

13. The apparatus of claim 8, wherein:
the first video media data associated with the first track comprises one or more input tracks for the overlay composition;
the overlay composition metadata comprises the source metadata, the source metadata comprising a source count that specifies a number of the one or more input tracks and a source depth that specifies a depth for three-dimensional content; and
performing the overlay composition of the first video media data comprises performing the overlay composition based on the source depth.

14. The apparatus of claim 8, wherein:
the first video media data associated with the first track comprises one or more input tracks for the overlay composition; and
determining the overlay composition metadata comprises determining overlay relationship description metadata, wherein the overlay relationship description metadata specifies, for each input track of the one or more input tracks, overlay metadata specific to the associated input track.

15. A method for encoding video data, the method comprising:
encoding a hierarchical track structure for multimedia data comprising at least a first track and a second track, wherein:
the first track is at a first level in the hierarchical track structure and comprises first video media data; and
the second track is at a second level in the hierarchical track structure above the first level of the first track and does not comprise any video media data; and
encoding overlay composition metadata associated with the second track, wherein the overlay composition metadata comprises offset metadata, layer metadata, source metadata, or some combination thereof;
wherein the overlay composition metadata specifies at least part of an overlay composition for the first video media data associated with the first track, wherein the overlay composition can be performed as part of a track derivation operation on the first video media data associated with the first track to generate second video media data of the second track, such that the second track is a derived track of the first track.

16. The encoding method of claim 15, wherein:
encoding the hierarchical track structure comprises encoding the first video media data associated with the first track, comprising one or more input tracks for the overlay composition; and
encoding the overlay composition metadata comprises encoding the offset metadata, wherein the offset metadata indicates whether an offset is specified for each of the one or more input tracks.

17. The encoding method of claim 16, wherein encoding the offset metadata comprises encoding data indicative of the offset being specified for each of the one or more inputs.

18. The encoding method of claim 15, wherein:
encoding the hierarchical track structure comprises encoding the first video media data associated with the first track, comprising one or more input tracks for the overlay composition; and
encoding the overlay composition metadata comprises encoding the layer metadata, wherein the layer metadata indicates whether a layer is specified for each of the one or more input tracks.

19. The encoding method of claim 18, wherein encoding the layer metadata comprises encoding data indicative of the layer being specified for each of the one or more input tracks.

20. The encoding method of claim 15, wherein:
encoding the hierarchical track structure comprises encoding the first video media data associated with the first track, comprising one or more input tracks for the overlay composition; and
encoding the overlay composition metadata comprises encoding the source metadata, the source metadata comprising a source count that specifies a number of the one or more input tracks and a source depth that specifies a depth for three-dimensional content.

21. The encoding method of claim 15, wherein:
encoding the hierarchical track structure comprises encoding the first video media data associated with the first track, comprising one or more input tracks for the overlay composition; and
encoding the overlay composition metadata comprises encoding overlay relationship description metadata, wherein the overlay relationship description metadata specifies, for each input track of the one or more input tracks, overlay metadata specific to the associated input track.

22. An apparatus for encoding video data, the apparatus comprising a processor in communication with memory, the processor being configured to execute instructions stored in the memory that cause the processor to:
encode a hierarchical track structure for multimedia data comprising at least a first track and a second track, wherein:
the first track is at a first level in the hierarchical track structure and comprises first video media data; and
the second track is at a second level in the hierarchical track structure above the first level of the first track and does not comprise any video media data; and
encode overlay composition metadata associated with the second track, wherein the overlay composition metadata comprises offset metadata, layer metadata, source metadata, or some combination thereof;
wherein the overlay composition metadata specifies at least part of an overlay composition for the first video media data associated with the first track, wherein the overlay composition can be performed as part of a track derivation operation on the first video media data associated with the first track to generate second video media data of the second track, such that the second track is a derived track of the first track.

* * * * *